United States Patent
Valente et al.

(10) Patent No.: US 10,487,889 B2
(45) Date of Patent: Nov. 26, 2019

(54) DISCONNECTING AXLE ASSEMBLY

(71) Applicant: AMERICAN AXLE & MANUFACTURING, INC., Detroit, MI (US)

(72) Inventors: Paul J. Valente, Berkley, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

(21) Appl. No.: 16/077,202

(22) PCT Filed: Mar. 24, 2017

(86) PCT No.: PCT/US2017/024031
§ 371 (c)(1),
(2) Date: Aug. 10, 2018

(87) PCT Pub. No.: WO2017/165777
PCT Pub. Date: Sep. 28, 2017

(65) Prior Publication Data
US 2019/0024731 A1    Jan. 24, 2019

Related U.S. Application Data

(60) Provisional application No. 62/313,212, filed on Mar. 25, 2016.

(51) Int. Cl.
*F16H 57/04* (2010.01)
*F16D 43/28* (2006.01)
(Continued)

(52) U.S. Cl.
CPC ............ *F16D 43/28* (2013.01); *F16D 13/52* (2013.01); *F16D 13/74* (2013.01); *F16D 25/082* (2013.01);
(Continued)

(58) Field of Classification Search
None
See application file for complete search history.

(56) References Cited

U.S. PATENT DOCUMENTS

| 696,704 A | 4/1902 | Allen |
| 783,168 A | 2/1905 | Baker |

(Continued)

FOREIGN PATENT DOCUMENTS

| CN | 201334012 Y | 10/2009 |
| DE | 01627594 A1 | 8/1970 |

(Continued)

OTHER PUBLICATIONS

International Search Report and Written Opinion issued in PCT/US2017/024031, dated Jun. 8, 2017; ISA/US.
(Continued)

*Primary Examiner* — Dirk Wright
(74) *Attorney, Agent, or Firm* — Harness, Dickey & Pierce, P.L.C.

(57) ABSTRACT

A disconnecting axle includes a housing assembly including a first end cap coupled to a first side of a housing member to define a clutch cavity, and a second end cap coupled to a second side of the housing member to define a differential cavity. The housing member can define a central bore, a sump, and a plurality of passages. The central bore extends axially between the clutch and differential cavities. The sump can be spaced apart from the clutch and differential cavities, and the central bore. A clutch passage couples the clutch cavity to the sump. A differential passage couples the differential cavity to the sump. A first output member of the differential extends axially within the central bore. A piston is configured to compress friction plates to selectively transmit torque. A pump can pump fluid from the sump to the cylinder to move the piston.

20 Claims, 15 Drawing Sheets

(51) Int. Cl.
*F16D 13/52* (2006.01)
*F16D 13/74* (2006.01)
*F16D 25/08* (2006.01)
*F16D 25/12* (2006.01)
*F16H 48/22* (2006.01)
*F16H 48/10* (2012.01)

(52) U.S. Cl.
CPC ........... *F16D 25/123* (2013.01); *F16H 48/10* (2013.01); *F16H 48/22* (2013.01); *F16H 57/0404* (2013.01); *F16H 57/0424* (2013.01); *F16D 2300/06* (2013.01); *F16H 57/043* (2013.01); *F16H 57/0431* (2013.01); *F16H 57/0441* (2013.01); *F16H 57/0452* (2013.01); *F16H 57/0471* (2013.01); *F16H 57/0473* (2013.01); *F16H 57/0479* (2013.01); *F16H 57/0483* (2013.01)

(56) References Cited

U.S. PATENT DOCUMENTS

| | | |
|---|---|---|
| 899,891 A | 9/1908 | Niclausse |
| 1,987,716 A | 1/1935 | Skelton |
| 2,187,614 A | 1/1940 | Ormsby |
| 2,548,258 A | 4/1951 | Griffith |
| 2,609,710 A | 9/1952 | Osborn |
| 2,882,752 A | 4/1959 | Russell |
| 3,115,048 A | 12/1963 | Cape |
| 3,344,687 A | 10/1967 | Stockton |
| 3,385,133 A | 5/1968 | Terao |
| 3,394,610 A | 7/1968 | Szodfridt |
| 3,762,503 A | 10/1973 | Wilder et al. |
| 3,777,360 A | 12/1973 | Welch |
| 3,792,625 A | 2/1974 | Asberg |
| 4,004,472 A | 1/1977 | Millward et al. |
| 4,041,804 A * | 8/1977 | Clark ................ F16H 48/10 475/88 |
| 4,103,567 A | 8/1978 | Franco et al. |
| 4,182,201 A | 1/1980 | Mayhew et al. |
| 4,754,847 A | 7/1988 | Glaze et al. |
| 5,098,355 A | 3/1992 | Long |
| 5,203,750 A | 4/1993 | Oster et al. |
| 5,310,388 A * | 5/1994 | Okcuoglu ............ B60K 17/20 475/88 |
| 5,503,494 A | 4/1996 | Kamata et al. |
| 5,520,589 A | 5/1996 | Dewald et al. |
| 5,560,687 A | 10/1996 | Hagelthorn |
| 5,865,701 A | 2/1999 | Sowa et al. |
| 5,913,745 A | 6/1999 | Inagaki et al. |
| 6,056,663 A | 5/2000 | Fett |
| 6,077,183 A | 6/2000 | Tar et al. |
| 6,095,939 A | 8/2000 | Burns et al. |
| 6,283,884 B1 | 9/2001 | El-Kassouf |
| 6,413,182 B1 * | 7/2002 | Yates, III ................ F16H 48/08 475/86 |
| 6,432,014 B2 * | 8/2002 | Fujie ....................... F16H 48/10 475/150 |
| 6,540,634 B2 | 4/2003 | Thompson |
| 6,544,140 B2 | 4/2003 | Gradu et al. |
| 6,582,334 B1 | 6/2003 | Noll |
| 6,616,565 B1 | 9/2003 | Chen et al. |
| 6,623,396 B2 | 9/2003 | Szalony et al. |
| 6,645,113 B2 | 11/2003 | Orr et al. |
| 6,652,408 B2 | 11/2003 | Rutt et al. |
| 6,695,739 B2 | 2/2004 | Fett |
| 6,699,154 B2 | 3/2004 | Orr et al. |
| 6,702,707 B2 | 3/2004 | Krzesicki et al. |
| 6,719,661 B2 | 4/2004 | Turner et al. |
| 6,824,489 B2 | 11/2004 | Jacob et al. |
| 6,863,634 B2 | 3/2005 | Holman et al. |
| 6,863,684 B2 | 3/2005 | Kim et al. |
| 6,896,463 B2 | 5/2005 | Tuthill |
| 7,022,041 B2 | 4/2006 | Valente |
| 7,086,983 B2 | 8/2006 | Turner et al. |
| 7,155,824 B2 | 1/2007 | Prucher |
| 7,188,699 B2 | 3/2007 | Moore et al. |
| 7,232,399 B2 | 6/2007 | Valente |
| 7,314,416 B2 | 1/2008 | Loughrin et al. |
| 7,361,114 B2 * | 4/2008 | Boddy ................ F16D 29/00 475/231 |
| 7,393,301 B2 | 7/2008 | Green, Jr. |
| 7,500,934 B2 | 3/2009 | Ziech |
| 7,520,833 B2 | 4/2009 | Honda et al. |
| 7,775,928 B2 | 8/2010 | Zink |
| 7,901,318 B2 | 3/2011 | Downs et al. |
| 7,984,782 B2 | 7/2011 | Platt et al. |
| 8,167,758 B2 | 5/2012 | Downs et al. |
| 8,469,854 B1 | 6/2013 | Downs et al. |
| 8,616,780 B2 | 12/2013 | Kwasniewski et al. |
| 8,795,126 B2 | 8/2014 | Downs et al. |
| 8,951,159 B2 | 2/2015 | Fox et al. |
| 8,986,148 B2 | 3/2015 | Downs et al. |
| 8,986,151 B2 | 3/2015 | Valente et al. |
| 9,028,358 B2 | 5/2015 | Valente et al. |
| 9,062,744 B2 | 6/2015 | Valente et al. |
| 9,079,495 B2 | 7/2015 | Valente et al. |
| 9,157,515 B2 | 10/2015 | Downs et al. |
| 9,249,872 B2 | 2/2016 | Downs et al. |
| 9,249,873 B2 | 2/2016 | Pump et al. |
| 9,254,713 B2 | 2/2016 | Downs et al. |
| 9,302,581 B1 | 4/2016 | Valente |
| 9,346,354 B2 | 5/2016 | Valente |
| 10,309,521 B2 * | 6/2019 | Takuno ............... B60K 17/344 |
| 2003/0070501 A1 | 4/2003 | Bell |
| 2003/0186774 A1 | 10/2003 | Sullivan |
| 2005/0101430 A1 | 5/2005 | Ziech |
| 2005/0167228 A1 | 8/2005 | Baxter |
| 2005/0245342 A1 | 11/2005 | Pontanari et al. |
| 2009/0163313 A1 | 6/2009 | Gassmann et al. |
| 2011/0123264 A1 | 5/2011 | Wang |
| 2012/0031727 A1 | 2/2012 | Nett et al. |
| 2013/0303323 A1 | 11/2013 | Zink et al. |
| 2014/0342866 A1 | 11/2014 | Valente et al. |
| 2015/0167813 A1 | 6/2015 | Downs et al. |
| 2016/0272003 A1 | 9/2016 | Downs et al. |

FOREIGN PATENT DOCUMENTS

| | | |
|---|---|---|
| DE | 07106774 U | 5/1971 |
| DE | 02132412 A1 | 1/1972 |
| DE | 03132443 A1 | 2/1983 |
| DE | 19713211 A1 | 12/1997 |
| DE | 10209166 A1 | 9/2003 |
| DE | 102012206143 A1 | 10/2013 |
| EP | 1348589 A2 | 10/2003 |
| GB | 00881308 A | 11/1961 |
| JP | S60-884472 A | 5/1985 |
| JP | H06-117518 A | 4/1994 |
| JP | 2001010304 A | 1/2001 |
| JP | 2011063224 A | 3/2011 |
| WO | WO-2010123964 A1 | 10/2010 |
| WO | WO-2014151287 A1 | 9/2014 |

OTHER PUBLICATIONS

Decker, et al., "Decker Maschinenelemente. Funktion, Gestaltung und Berechnung", 17$^{th}$ revised edition, 2009.
Sajaz, "Radlager", Version Jul. 10, 2012.
Yutuo, et al., "Effect of Mn on hardenability of 25CrMo axle steel by an improved end-quench test", China Foundry, Nov. 2012, vol. 9, No. 4.
Biermann, et al., "Schaeffler lightweight differentials, A family of differentials reduced in space and weight", Schaeffler Symposium 2010, pp. 94-105.

* cited by examiner

DISCONNECTING AXLE ASSEMBLY

CROSS-REFERENCE TO RELATED APPLICATIONS

This application is a U.S. National Phase Application under 35 U.S.C. 371 of International Application No. PCT/US2017/024031 filed on Mar. 24, 2017 and published in English as WO 2017/165777 A1 on Sep. 28, 2017. This application claims the benefit of U.S. Provisional Application No. 62/313,212, filed on Mar. 25, 2016. The entire disclosure of the above-identified applications are incorporated herein by reference.

FIELD

The present disclosure relates to a disconnecting axle assembly.

BACKGROUND

This section provides background information related to the present disclosure which is not necessarily prior art.

Disconnecting axle assemblies, such as rear drive axles in all-wheel drive vehicles, typically include a differential to provide differential power to left and right wheels, and one or more disconnecting clutches to inhibit power output to the wheels. While current disconnecting axle assemblies are well suited for certain applications, there is an increased need for smaller, more compact disconnecting axle assemblies that can handle increased torque levels. Accordingly, there exists a need for improved disconnecting axle assemblies.

SUMMARY

This section provides a general summary of the disclosure, and is not a comprehensive disclosure of its full scope or all of its features.

In one form, the present teachings provide for a disconnecting axle assembly including a housing assembly, a differential, and a clutch. The housing assembly can include a first end cap, a second end cap, a sump cover, and a housing member. The housing member can define a central bore, a clutch return passage, and a differential return passage. The first end cap can be fixedly coupled to a first side of the housing member such that the first end cap and the housing member can define a clutch cavity. The second end cap can be fixedly coupled to a second side of the housing member such that the second end cap and the housing member can define a differential cavity spaced apart from the clutch cavity. The central bore can be disposed about an output axis and can extend axially between the clutch cavity and the differential cavity. The sump cover can be fixedly coupled to a third side of the housing member such that the sump cover and the housing member can define a sump that is spaced apart from the clutch cavity, the differential cavity, and the central bore. The clutch return passage can couple the clutch cavity to the sump in fluid communication. The differential return passage can couple the differential cavity to the sump in fluid communication. The differential can be disposed within the differential cavity. The differential can include an input member, a first output member, and a second output member. The first output member can be supported within the housing assembly for rotation about the output axis and can extend axially within the central bore. The clutch can include a plurality of friction plates disposed within the clutch cavity and an actuator. A first set of the friction plates can be coupled to the first output member for common rotation about the output axis. A second set of the friction plates can be interleaved with the first set and coupled to a third output member for common rotation about the output axis. The actuator can include a pump and a piston slidably disposed in a cylinder. The piston can be configured to axially compress the friction plates to selectively transmit torque between the first and third output members. The pump can be coupled to the housing assembly and configured to pump fluid from the sump to the cylinder.

According to a further embodiment, the clutch return passage can have a first aperture open to the clutch cavity proximate to a bottom of the clutch cavity and the clutch return passage can be open to the sump at a location below the first aperture. The differential return passage can have a second aperture open to the differential cavity proximate to a bottom of the differential cavity and the differential return passage can be open to the sump at a location that is below the second aperture.

According to a further embodiment, the housing member can further define a bore return passage having an inlet open to the central bore and an outlet open to the sump. The inlet of the bore return passage can be above the outlet of the bore return passage.

According to a further embodiment, the clutch includes a first clutch portion and a second clutch portion. The first friction plates can be axially slidable relative to the first clutch portion and coupled for common rotation about the output axis with the first clutch portion. The second friction plates can be axially slidable relative to the second clutch portion and coupled for common rotation about the output axis with the second clutch portion. The first clutch portion can be fixedly coupled to the first output member and can include a projection that extends radially outward to inhibit movement of the first and second clutch plates in a first axial direction to retain the first and second clutch plates between the first and second clutch portions.

According to a further embodiment, the housing member can further define an air balance passage. The air balance passage can extend axially between the clutch cavity and the differential cavity and can be spaced apart from the central bore and open to the clutch cavity and the differential cavity above the output axis.

According to a further embodiment, the housing member can define a bleed port open to the cylinder and the air balance passage. The bleed port can be configured to restrict flow of fluid from the cylinder to a flowrate that is less than a flowrate of fluid pumped from the sump to the cylinder.

According to a further embodiment, the differential can include a differential gearset configured to receive input torque from the input member and output differential torque to the first and second output members.

According to a further embodiment, the differential gearset can be a planetary gearset including an internal gear, a planet carrier, a plurality of planet gears, and a sun gear. The input member of the differential can be fixedly coupled to the internal gear. The first output can be fixedly coupled to the planet carrier. The second output can be fixedly coupled to the sun gear.

According to a further embodiment, the first output member can include a tubular shaft and a flange member. A first end of the flange member can include a plurality of splines that meshingly engage a plurality of mating splines on the tubular shaft within the central bore. A second end of the flange member can be disposed within the differential cavity and can extend radially outward of the first end of the flange member. The second end of the flange member can be fixedly coupled to the planet carrier.

According to a further embodiment, the sun gear can include a hub member that is supported by the first output member by a bearing disposed radially between the first output member and the hub member.

According to a further embodiment, the disconnecting axle assembly can further include a hypoid gear and an input pinion. The input member of the differential can be fixedly coupled to the hypoid gear. The input pinion can be meshingly engaged with the hypoid gear and can be rotatably supported by the housing member for rotation about a second axis that is transverse to the output axis.

According to a further embodiment, the disconnecting axle assembly can further include a head bearing disposed within a bearing recess defined by the housing member. The head bearing can support the input pinion for rotation relative to the housing member. The housing member can further define a pinion return passage that couples the bearing recess and the central bore in fluid communication.

In another form, the present teachings provide for a disconnecting axle assembly including a housing assembly, a differential, and a clutch. The housing assembly can include first end cap, a second end cap, a sump cover, and a housing member. The housing member can define a central bore, a clutch supply passage, and a clutch return passage. The first end cap can be fixedly coupled to a first side of the housing member such that the first end cap and a first annular wall of the housing member define a clutch cavity. The second end cap can be fixedly coupled to a second side of the housing member such that the second end cap and a second annular wall of the housing member can define a differential cavity spaced apart from the clutch cavity. The central bore can be disposed about an output axis and can extend axially between the first and second annular walls to couple the clutch cavity and the differential cavity for fluid communication. The sump cover can be fixedly coupled to a third side of the housing member such that the sump cover and the housing member can define a sump that is spaced apart from the clutch cavity, the differential cavity, and the central bore. The housing member can include a third annular wall and a fourth annular wall that extend axially from the first annular wall to define an annular cylinder. The clutch supply passage can be open through the first annular wall radially between the third and fourth annular walls to be in fluid communication with the annular cylinder. The clutch return passage can be open through the first annular wall radially outward of the annular cylinder and can couple the clutch cavity to the sump for fluid communication. The differential can be disposed within the differential cavity. The differential can include an input member, a first output member, and a second output member. The first output member can be supported within the housing assembly for rotation about the output axis and can extend axially within the central bore. The clutch can include a plurality of friction plates disposed within the clutch cavity and can include an actuator. A first set of the friction plates can be coupled to the first output member for common rotation about the output axis. A second set of the friction plates can be interleaved with the first set and can be coupled to a third output member for common rotation about the output axis. The actuator can include a piston and a pump. The piston can be slidably disposed in the annular cylinder. The piston can be configured to axially compress the friction plates to selectively transmit torque between the first and third output members.

The pump can have an inlet in fluid communication with the sump and an outlet in fluid communication with the clutch supply passage.

According to a further embodiment, the clutch return passage can have a first aperture open to the clutch cavity proximate to a bottom of the clutch cavity. The clutch return passage can be open to the sump at a location below the first aperture.

According to a further embodiment, the housing member can define a differential return passage that has a first aperture open to the differential cavity proximate to a bottom of the differential cavity. The differential return passage can be open to the sump at a location that is below the first aperture.

According to a further embodiment, the housing member can further define a bore return passage having an inlet open to the central bore and an outlet open to the sump. The inlet of the bore return passage can be above the outlet of the bore return passage.

According to a further embodiment, the clutch can include a first clutch portion and a second clutch portion. The first friction plates can be axially slidable relative to the first clutch portion and coupled for common rotation about the output axis with the first clutch portion. The second friction plates can be axially slidable relative to the second clutch portion and coupled for common rotation about the output axis with the second clutch portion. The first clutch portion can be fixedly coupled to the first output member and can include a projection that extends radially outward to inhibit movement of the first and second clutch plates in a first axial direction to retain the first and second clutch plates between the first and second clutch portions.

According to a further embodiment, the housing member can further define an air balance passage and a bleed port. The air balance passage can be spaced apart from the central bore and open through the first and second annular walls to couple the clutch cavity and the differential cavity for fluid communication above the output axis. The bleed port can be open through the first annular wall radially between the third and fourth annular walls to be open to the annular cylinder. The bleed port can further be open to the air balance passage and configured to restrict flow of fluid from the cylinder to a flowrate that is less than a flowrate of fluid pumped from the sump to the cylinder.

According to a further embodiment, the differential can include a planetary gearset including an internal gear, a planet carrier, a plurality of planet gears, and a sun gear. The input member of the differential can be fixedly coupled to the internal gear. The first output can be fixedly coupled to the planet carrier. The second output can be fixedly coupled to the sun gear.

According to a further embodiment, the first output member can include a tubular shaft and a flange member. A first end of the flange member can include a plurality of splines that meshingly engage a plurality of mating splines on the tubular shaft within the central bore. A second end of the flange member can be disposed within the differential cavity and can extend radially outward of the first end of the flange member and be fixedly coupled to the planet carrier.

According to a further embodiment, the disconnecting axle assembly can further include a filter disposed within the sump and configured to filter fluid flow between the pump and the sump.

According to a further embodiment, the filter has a base end that sealingly engages the sump cover and a top end that sealingly engages the pump.

According to a further embodiment, the filter has a frusto-conical shape, wherein the top end of the filter is a frustum end of the frusto-conical shape.

According to a further embodiment, the sump cover defines a recess and the base end of the filter can be located in the recess.

According to a further embodiment, the housing member and/or the sump cover can define a plurality of baffles configured to inhibit sloshing of fluid in the sump.

According to a further embodiment, the disconnecting axle assembly can further include a stop member that can include a circumferential wall and a radially extending portion. The stop member can be received in the first end cap such that the circumferential wall of the stop member contacts a circumferential wall of the first end cap in an interference fit. The radially extending portion can extend radially inward from the circumferential wall of the stop member to overlap radially with an apply plate and the friction plates of the clutch.

According to a further embodiment, the first clutch portion can define a plurality of lubricating bores that extend radially through the first clutch portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
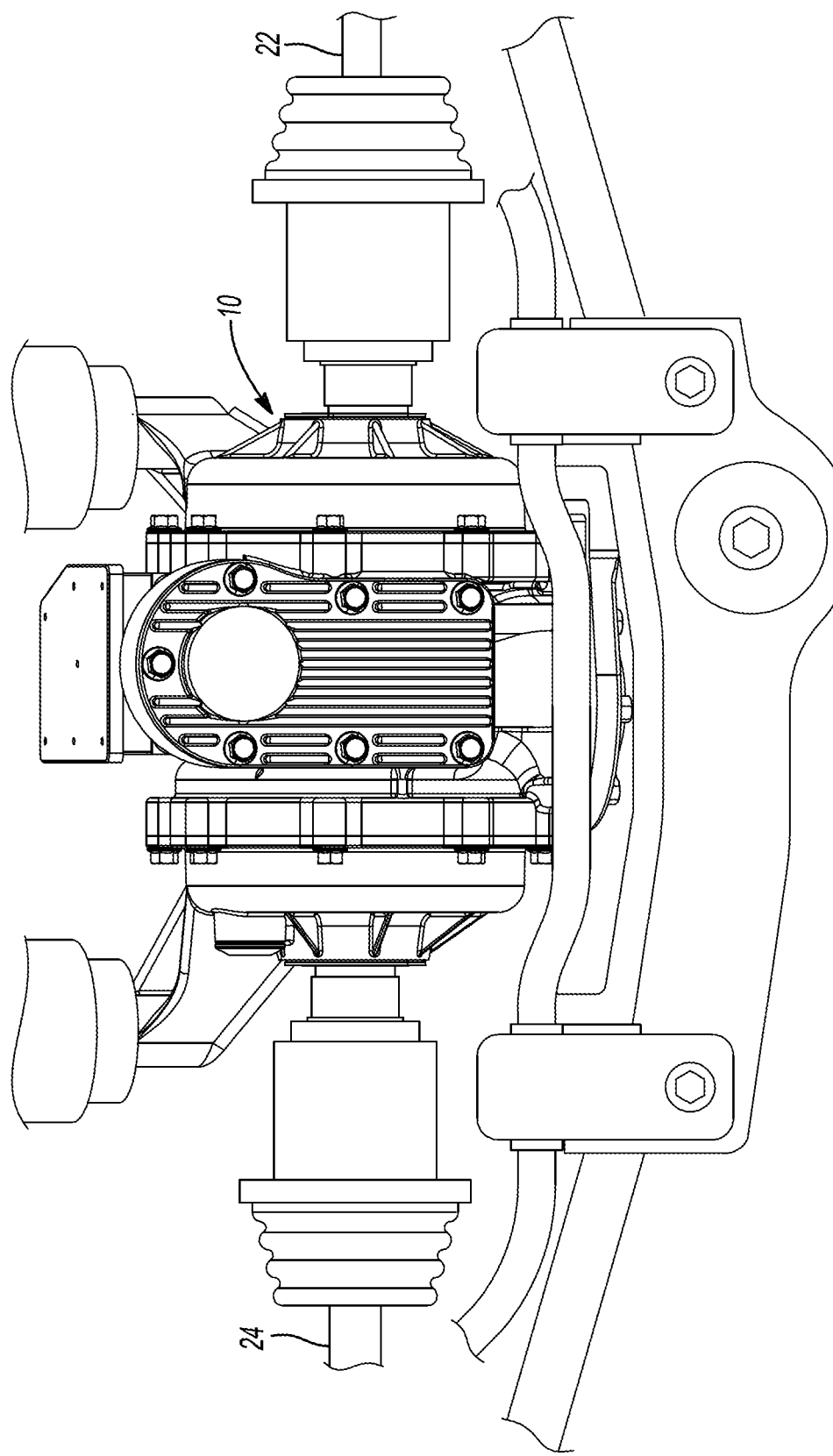
FIG. 1 is a bottom perspective view of an exemplary axle assembly constructed in accordance with the teachings of the present disclosure.
Figure 2:
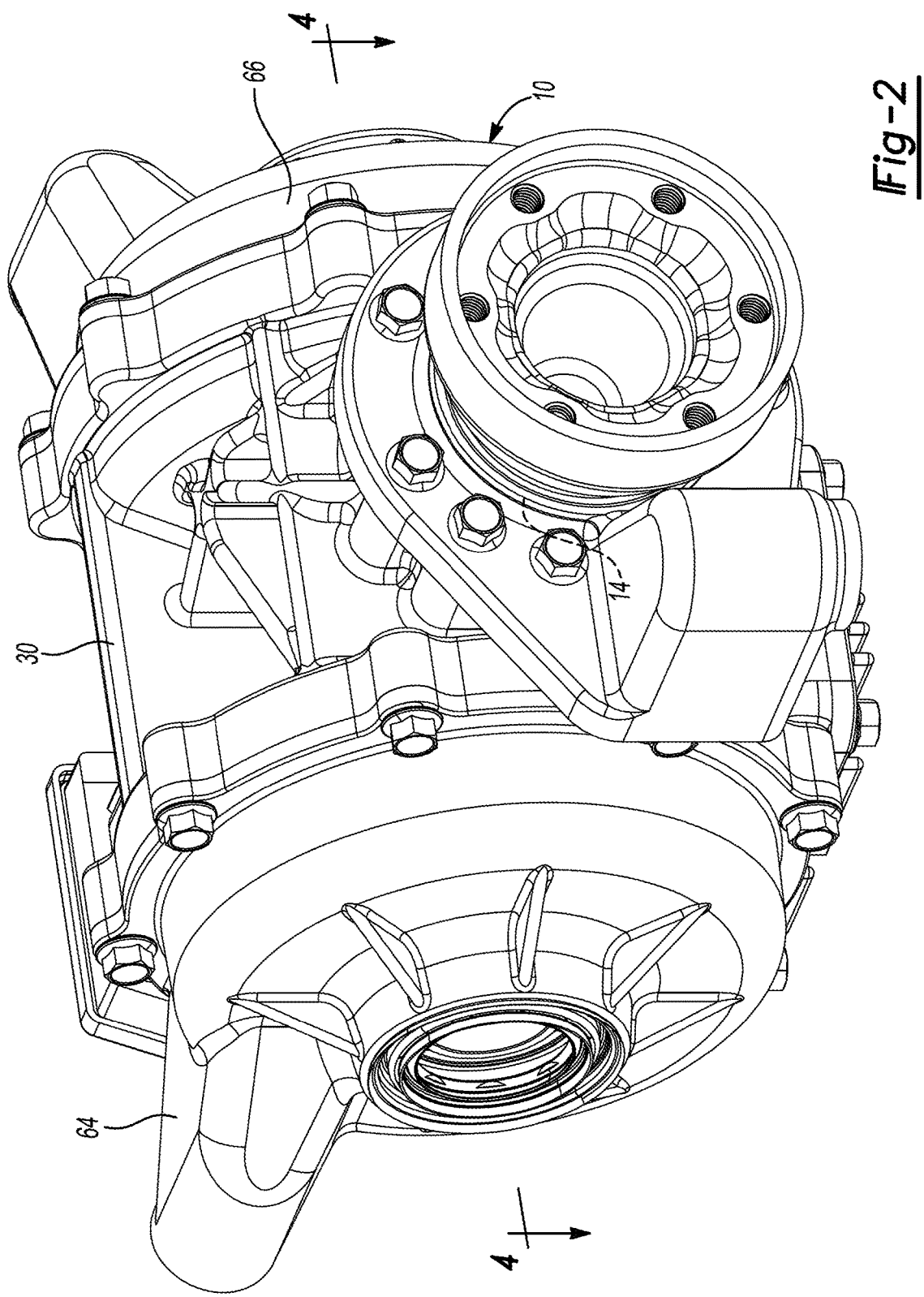
FIG. 2 is a front perspective view of the axle assembly of FIG. 1.

Example embodiments will now be described more fully with reference to the accompanying drawings.

With reference to FIGS. 1 through 4 of the drawings, an exemplary axle assembly constructed in accordance with the teachings of the present disclosure is generally indicated by reference numeral 10. The axle assembly 10 can include an axle housing assembly 12, an input pinion 14, a ring gear 16, a differential assembly 18, a clutch 20 and first and second output members 22 and 24, respectively.

Generally, and except as described herein, the input pinion 14, the ring gear 16, and associated portions of the axle housing assembly 12 can be configured as is described in co-pending U.S. Pat. Nos. 9,157,515, 9,103,427 and 9,028,358, the disclosures of which are hereby incorporated by reference as if fully set forth in detail herein.

Briefly, the axle housing assembly 12 can include a carrier or main housing 30 and an oil pan 26 that can cooperate to define a sump 28, as will be described in more detail below. The input pinion 14 can be mounted on a tail bearing 32 and a head bearing 34 that can solely support the input pinion 14 for rotation relative to the carrier housing 30 about a first axis 36. The tail bearing 32 can be a four-point angular contact bearing having an inner bearing race 38 that is unitarily and integrally formed into a shaft portion 40 of the input pinion 14. The outer race 42 of the tail bearing 32 can be defined by a pair of race members (not specifically shown) that can be spaced apart from one another along the first axis 36. The head bearing 34 can be any appropriate type of bearing, such as a roller bearing, that can be mounted to a cylindrical projection 46 that is formed on the input pinion 14. In the particular example provided, the head bearing 34 is not intended to handle the transmission of loads directed in an axial direction along the first axis 36 between the main housing 30 and the input pinion 14, but it will be appreciated that the head bearing 34 could be configured to transmit axial load (e.g., an angular contact bearing) if desired. The head bearing 34 can be spaced apart from the tail bearing 32 so that a pinion gear 48 of the input pinion 14 is disposed between the tail and head bearings 32 and 34. The ring gear 16 can be mounted on a four-point angular contact bearing 50 that can support the ring gear 16 for rotation relative to the carrier housing 30 about a second axis 52. The four-point angular contact bearing 50 can have an outer bearing race 54, which can be unitarily and integrally formed in the ring gear 16, and an inner bearing race 56. One of the outer and inner bearing races 54 and 56 could be formed by one or more members (not specifically shown) that can be spaced apart along the second axis 52.

Figure 4:
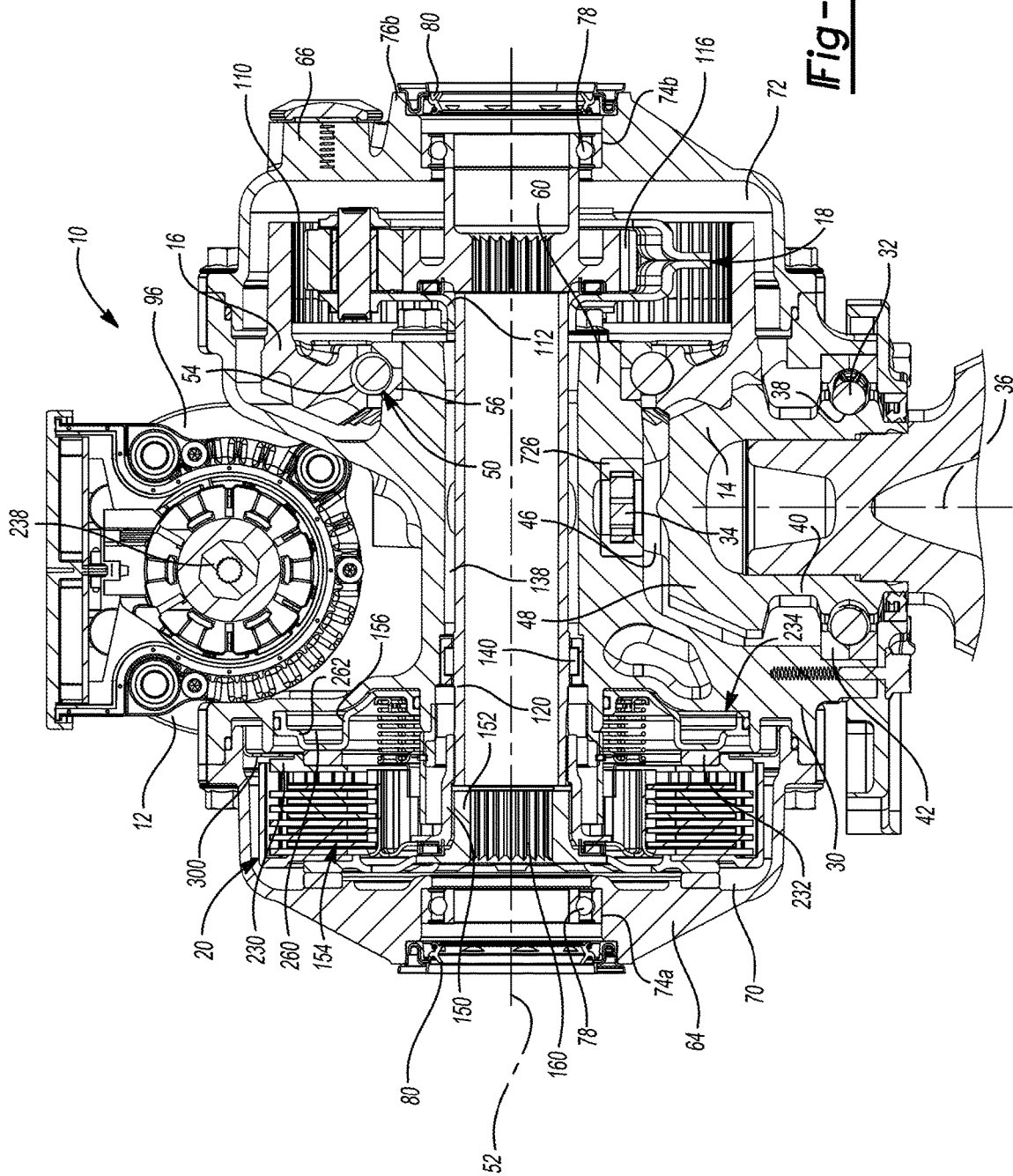
FIG. 4 is a section view of a portion of the axle assembly of FIG. 1 taken longitudinally along a rotational axis of a differential assembly.

With specific reference to FIG. 4, the four-point angular contact bearing 50 that supports the ring gear 16 can be mounted on a generally tubular portion 60 on the carrier housing 30 and a plurality of bolts 62 can be threaded onto holes (not specifically shown) in the tubular portion 60 to preload the four-point angular contact bearing 50. The axle housing assembly 12 can further comprise first and second end caps 64 and 66, respectively, that can be fixedly but removably coupled to the opposite axial ends of the carrier housing 30.

The first end cap 64 can cooperate with a first axial end of the carrier housing 30 to define a clutch cavity 70 into which portions of the clutch 20 can be received, while the second end cap 66 can cooperate with a second, opposite axial end of the carrier housing 30 to define a differential cavity 72 into which the differential assembly 18 can be received. The first and second end caps 64 and 66 can further define bearing mounts 74a and 74b, respectively, and seal mounts 76a and 76b, respectively. Bearings 78 can be mounted on the bearing mounts 74a and 74b and can be configured to support the first and second output members 22 and 24 (FIG. 1), respectively, for rotation relative to the axle housing assembly 12. Shaft seals 80 can be mounted on the seal mounts 76a and 76b and can be configured to form seals between the axle housing assembly 12 and the first and second output members 22 and 24 (FIG. 1), respectively. The first and second end caps 64 and 66 can be sealingly engaged to the carrier housing 30 in any manner that is desired.

In the particular example provided, the differential assembly 18 is a planetary-type differential assembly having an internal gear 110, a planet carrier 112, a plurality of planet gear pairs (not specifically shown) and a sun gear 116. The internal gear 110 can be fixedly coupled to the ring gear 16 for common rotation about the second axis 52. In the particular example provided, the internal gear 110 is unitarily and integrally formed with the ring gear 16. The teeth of the internal gear 110 can be formed in any desired manner (e.g., broaching, scudding, or power skiving) and could be formed and thereafter cold coined after heat treatment of the ring gear 16. It will be appreciated, however that the ring gear 16 and the internal gear 110 could be formed as discrete components and coupled together via a connection means, such as a toothed or spline connection, welding and/or a plurality of fasteners.

The planet carrier 112 can comprise a carrier body and a plurality of pins. The carrier body can comprise a pair of carrier plates that can have a generally annular shape and can be spaced apart along the second axis 52. One of the carrier plates can be coupled to a tubular shaft 120 for common rotation. The tubular shaft 120 can be received through a central bore 138 of the tubular portion 60 of the carrier housing 30. In the example provided, the tubular shaft 120 is received into an annular collar formed on one of the carrier plates and the carrier plate and tubular shaft 120 are welded together. Each of the pins can be fixedly coupled to the carrier plates and can journally support an associated planet gear. Each planet gear pair can include a first planet gear, which is meshingly engaged to the teeth of the internal gear 110, and a second planet gear that can be meshingly engaged to the first planet gear and the sun gear 116. While the differential assembly 18 has been illustrated and described as having compound planet gears (e.g., planet gear pairs), it will be appreciated that the differential assembly 18 could employ a planetary arrangement in which planet gears meshed to both the internal gear 110 and the sun gear 116, or could employ a gearset having bevel pinons or helical pinions. The sun gear 116 can have an internally splined aperture that is configured to receive a matingly splined segment (not shown) on the second output member 24 (FIG. 1).

The tubular shaft 120 can be supported for rotation relative to the generally carrier housing 30 via a bearing 140, such as roller or needle bearing. It will be appreciated that the sun gear 116 and the planet carrier 112 can be considered to be differential outputs of the differential assembly 18.

The clutch 20 can be any type of clutch that is configured to selectively transmit rotary power between the differential assembly 18 and the first output member 22 (FIG. 1). In the particular example provided, the clutch 20 is a friction clutch that comprises a first clutch portion 150, a second clutch portion 152, a clutch pack 154, and an actuator 156.

The first clutch portion 150 can be coupled to an end of the tube 120 that is opposite the planet carrier 112. The first clutch portion 150 can include an inner clutch hub onto which a plurality of first clutch plates (of the clutch pack 154) can be non-rotatably but axially slidably engaged. The second clutch portion 152 can be an outer clutch housing or drum on which second clutch plates (of the clutch pack 154) can be non-rotatably but axially slidably engaged. As will be appreciated, the first clutch plates can be interleaved with the second clutch plates. The second clutch portion 152 can include an internally splined segment that can be matingly engaged to a male splined segment (not shown) on the first output member 22 (FIG. 1).

The actuator 156 can comprise an apply plate 230, a thrust bearing 232, a cylinder assembly 234, one or more springs 236 (shown in FIG. 15), and a fluid pump 238. The apply plate 230 can be an annular structure that can be non-rotatably but axially slidably coupled to the second clutch portion 152. The thrust bearing 232 can be located or received on the apply plate 230. The cylinder assembly 234 can comprise a cylinder 260 and a piston 262. The cylinder 260 can be defined by an annular cavity formed in the carrier housing 30. The piston 262 can comprise an annular structure and a pair of seals that are mounted to the outside diametrical surface and the inside diametrical surface of the annular structure to form respective seals between the annular structure and outer and inner cylinder walls. The springs 236 (shown in FIG. 15) can bias the piston 262 in a predetermined return direction, such as toward a retracted position for example. In the example provided, the springs 236 are compression springs disposed axially between the piston 262 and a spring plate 1510 (shown in FIG. 15). One end of the springs 236 can abut the piston 262, while the other end can abut the spring plate 1510, which can be restricted from moving axially relative to the carrier housing 30 in a direction away from the piston 262, such as by a c-ring for example. The fluid pump 238 can be any type of pump, such as a gerotor pump, and can be mounted to the carrier housing 30, as will be described in more detail below.

Figure 5:
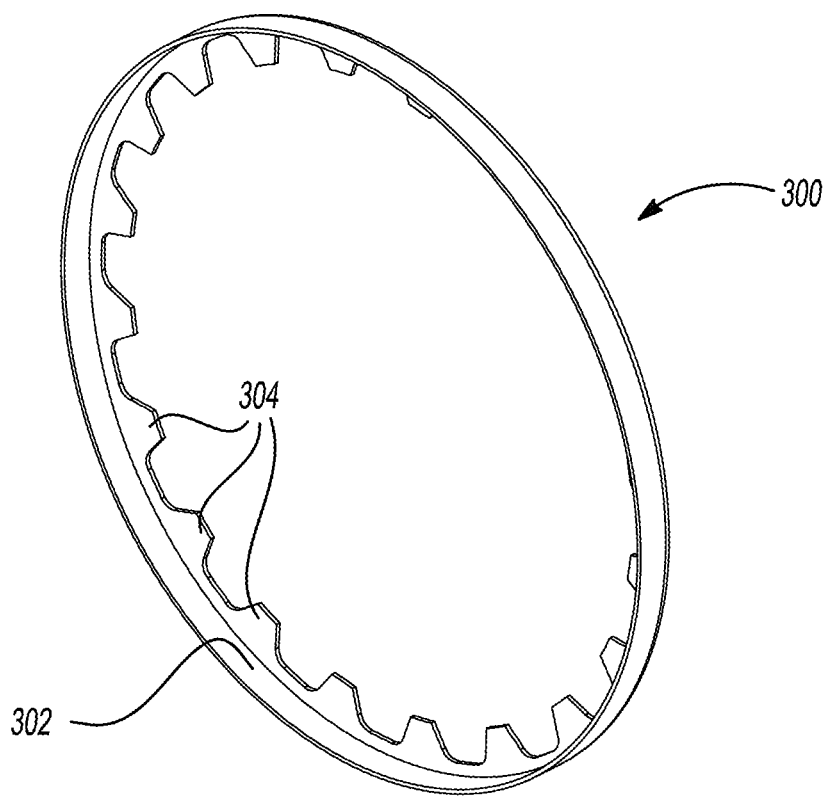
FIG. 5 is a perspective view of a stop member of the axle assembly of FIG. 1.

An optional stop member 300 can be received into the first end cap 64 and can be configured to retain the clutch pack 154 in the first end cap 64 during assembly of the axle assembly 10. With additional reference to FIG. 5, the stop member 300 can comprise a circumferential wall 302 and a plurality of circumferentially spaced teeth 304 that extend radially inwardly from the circumferential wall 302. The circumferential wall 302 can engage an inner diametrical surface of the first end cap 64 in an interference manner and can be located such that the teeth 304 are disposed in the path of the apply plate 230 and the second clutch plates (i.e., the clutch plates that are rotatably coupled to the second clutch portion 152). Contact between the apply plate 230 and the teeth 304 limits movement of the apply plate 230, the second clutch portion 152 and the clutch pack 154 in a direction toward the differential assembly 18.

Figure 3:
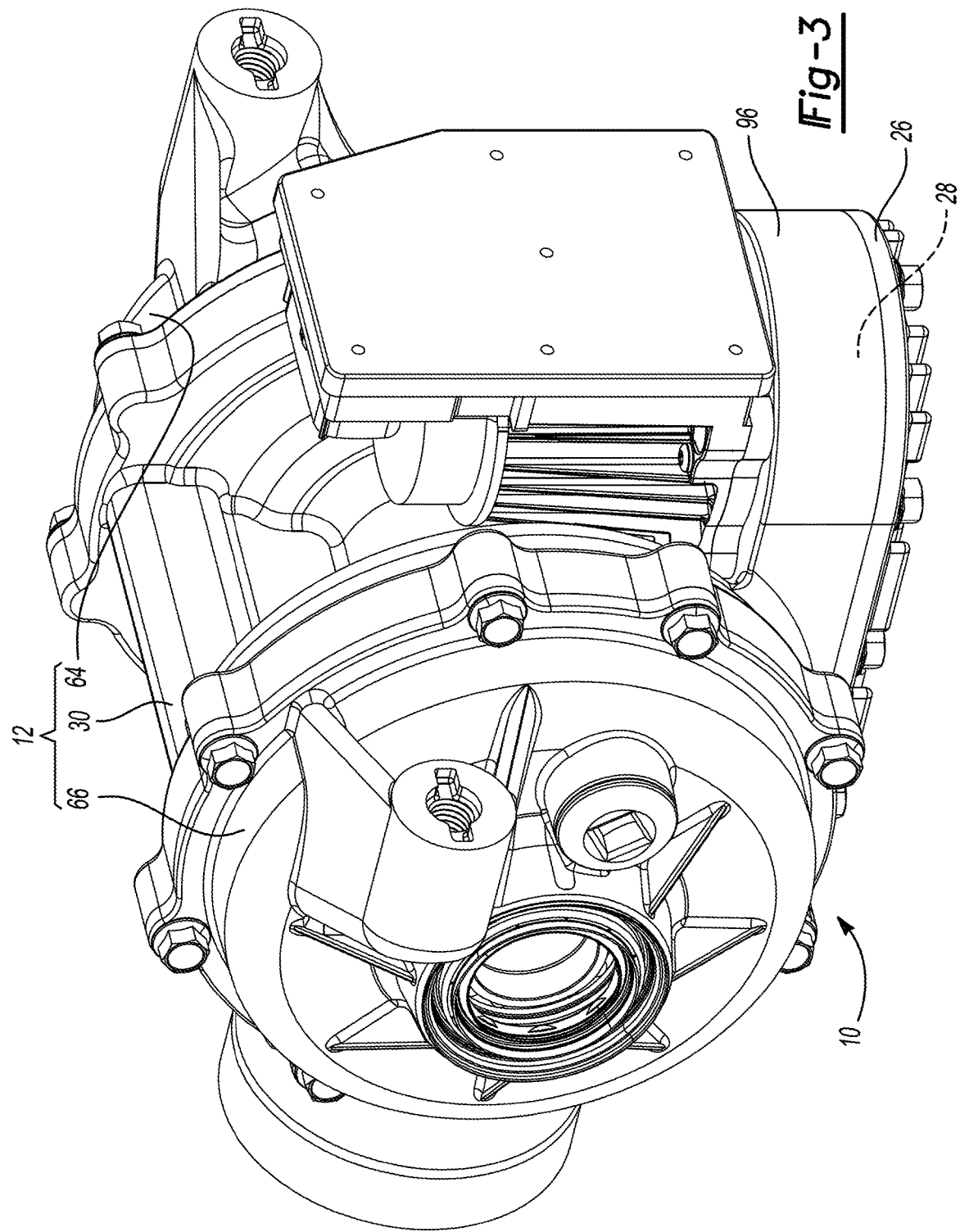
FIG. 3 is a rear perspective view of the axle assembly of FIG. 1.
Figure 6:
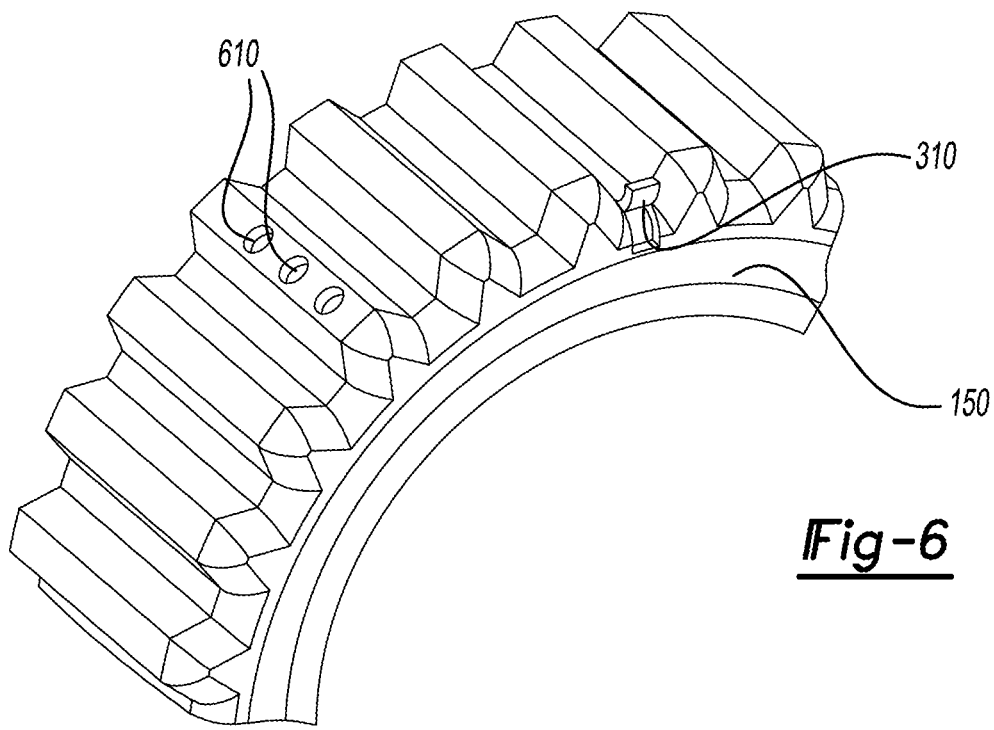
FIG. 6 is a perspective view of a portion of a clutch of the axle assembly of FIG. 1.

With reference to FIGS. 3 and 6, a projection 310 can be formed on the first clutch portion 150. The projection 310 is configured to engage one of the first clutch plates that is closest to the bearing 78 in the first end cover 64 to thereby limit travel of the first clutch portion 150 along the second axis 52 in a direction toward the differential assembly 18. It will be appreciated that the stop member 300 and the projection 310 can be employed as assembly aids during assembly of the axle assembly 10. In this regard, portions of the clutch assembly 20 can be sub-assembled into the first end cover 64 and thereafter assembled to the carrier housing 30. The stop member 300 and the projection 310 can permit sub-assembly (i.e., the portions of the clutch assembly 20 and the first end cover 64) to be turned/oriented in any desired manner and desirably prevent the clutch pack 254 and first clutch portion 250 from falling out of the first end cover 64.

Figure 7:
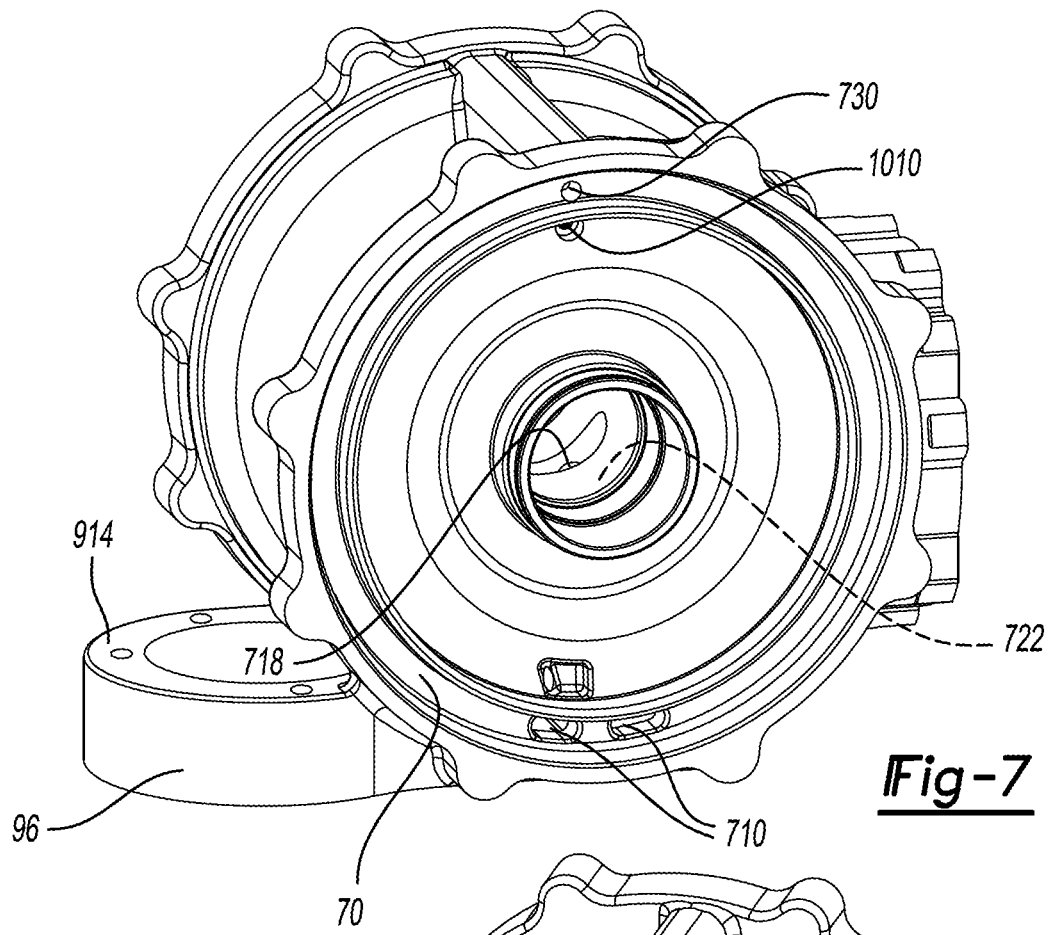
FIG. 7 is a first side perspective view of a carrier housing of the axle assembly of FIG. 1.
Figure 8:
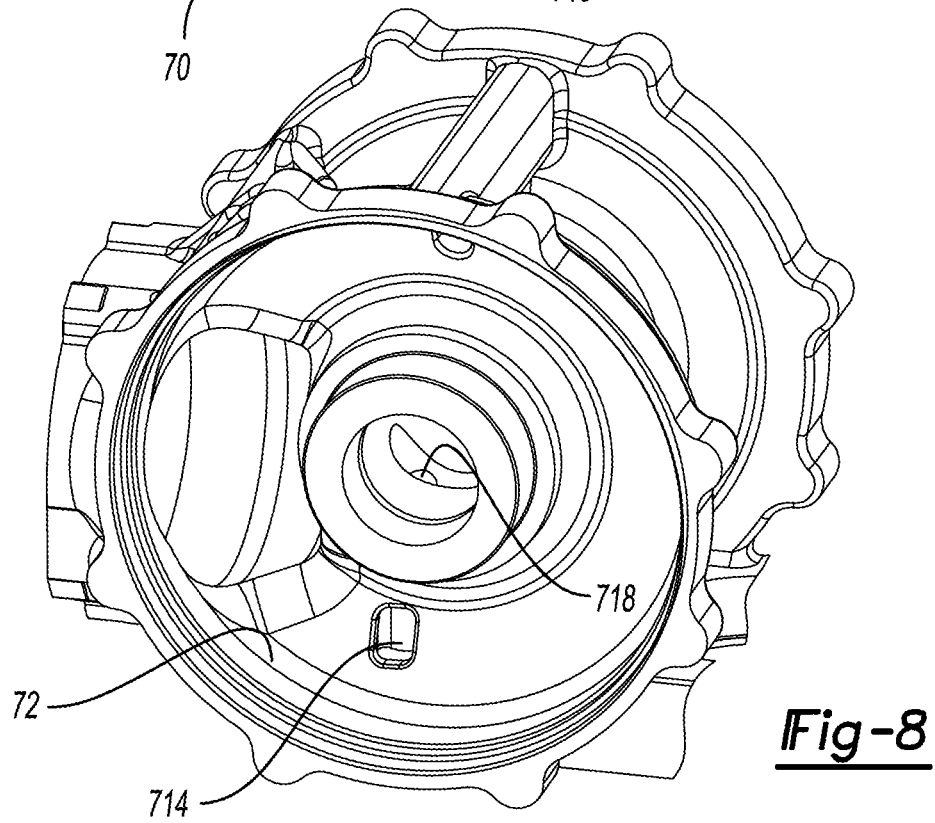
FIG. 8 is a second perspective view of the carrier housing of FIG. 6.
Figure 9:
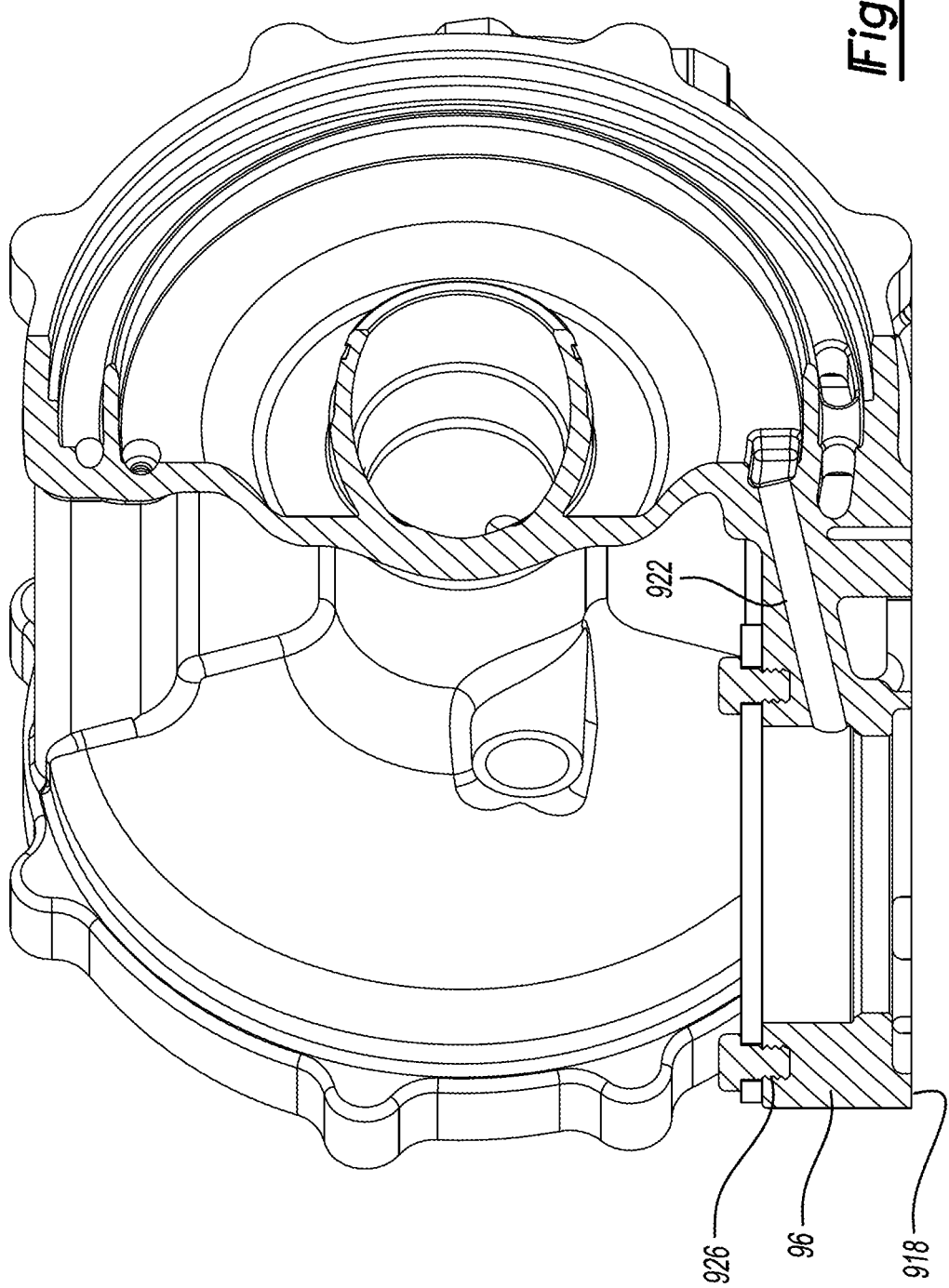
FIG. 9 is a partial sectional view of the carrier housing of FIG. 6, taken along line 9-9 shown on FIG. 7.

With additional reference to FIGS. 7-9, the carrier housing 30 can define a pump mount 96 to which the pump 238 can be mounted. The pump mount 96 can define a pump bore 910 that can generally pass through the pump mount 96 to be open at an upper side 914 of the pump mount 96 and a bottom side 918 of the pump mount 96. In the example provided, the bottom side 918 of the pump mount 96 is also the bottom side of the carrier housing 30. The carrier housing 30 can also define an oil supply passage 922 that can have one end open to the pump bore 910 and the other end open to the cylinder 260 of the actuator 156. The oil supply passage 922 can be open to the pump bore 910 axially between the upper side 914 of the pump mount 96 and the bottom side 918. Thus, the oil supply passage 922 can be in fluid communication with the pump bore 910 and the cylinder 260 of the actuator 156. In the example provided, the pump 238 is mounted to the pump mount 96 by a plurality of mounting bolts 926.

Figure 10:
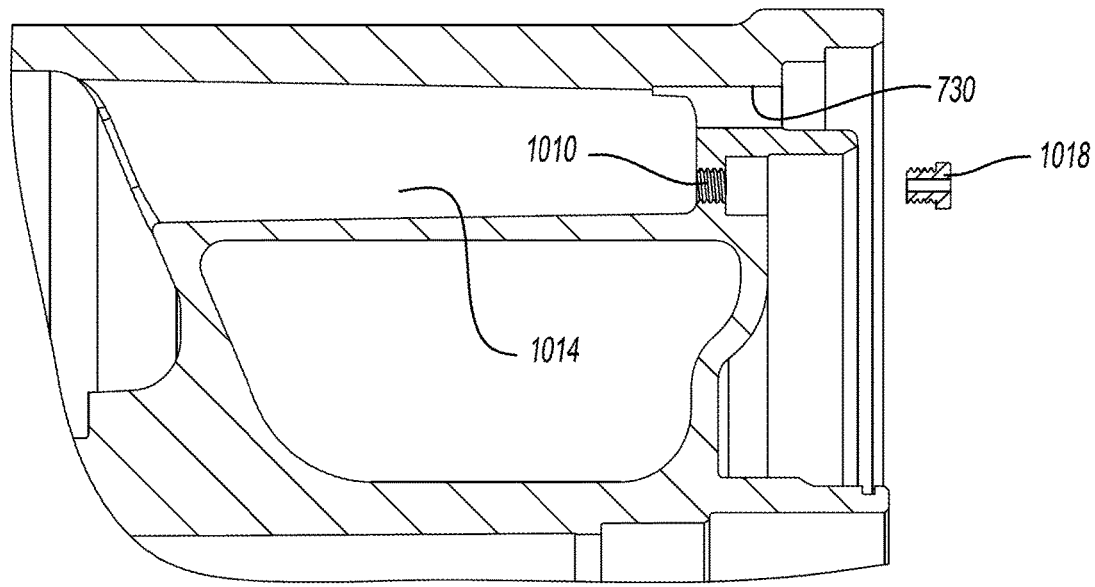
FIG. 10 is sectional view of a portion of the carrier housing of FIG. 6, taken along line 10-10 shown on FIG. 7.

With continued reference to FIG. 7 and additional reference to FIG. 10, the carrier housing 30 can also define a bleed port 1010 and an oil transfer passage 1014. The bleed port 1010 can be open to the cylinder 260 of the actuator 156 and to the oil transfer passage 1014 to permit fluid communication therebetween. In the example provided, the bleed port 1010 is located diametrically opposed to the oil supply passage 922, with the oil supply passage 922 located at a bottom of the cylinder 260 and the bleed port 1010 located at a top of the cylinder 260. The bleed port 1010 can have a predetermined diameter to be configured to meter a flowrate of oil from the cylinder 260 to the oil transfer passage 1014. In the example provided, the bleed port 1010 is threaded and a restrictor member 1018 having a predetermined diameter orifice can be threadably mounted thereto. Thus, the flowrate of oil through the bleed port 1010 can be tuned to the application by mounting a different restrictor member 1018 having a different diameter orifice to the bleed port 1010.

With reference to FIGS. 8 and 10, the oil transfer passage 1014 can be open to the differential cavity 72 to permit fluid communication from the oil transfer passage 1014 to the differential cavity 72. The oil transfer passage 1014 can extend generally longitudinally parallel to the second axis 52, above the tubular portion 60, such that the oil transfer passage 1014 can be open at a top of the differential cavity 72, i.e., above a static fluid level of the differential cavity 72, and proximate to the differential assembly 18.

With reference to FIGS. 7-12, the carrier housing 30 can also define a clutch return passage 710, a differential return passage 714, a central return passage 718, and a pinion return passage 722. The clutch return passage 710 can be open to the clutch cavity 70 and can be located radially outward of the cylinder 260 along a bottom of the clutch cavity 70. The clutch return passage 710 can be open to the sump 28 to permit fluid communication between the sump 28 and the clutch cavity 70. The differential return passage 714 can be open to the differential cavity 72 and can be located generally along a bottom of the differential cavity 72. The differential return passage 714 can be open to the sump 28 to permit fluid communication between the sump 28 and the differential cavity 72. The central return passage 718 can be open to the central bore 138 formed in the tubular portion 60. The central return passage 718 can be open to the sump 28 to permit fluid communication between the sump 28 and the central bore 138. The pinion return passage 722 can be open to the central bore 138 and to a bearing recess 726 (shown in FIGS. 4 and 15) in which the head bearing 34 is located to permit fluid communication from the head bearing 34 to the central bore 138

With reference to FIGS. 7 and 10, the carrier housing 30 can also define an air balance orifice 730. The air balance orifice 730 can be located radially outward of the cylinder 260 and at a location on the carrier housing 30 that is above a static fluid level of the clutch cavity 70 and the differential cavity 72 when the axle assembly 10 (FIG. 1) is positioned within a predetermined range of operating positions. In the particular example provided, the air balance orifice 730 is positioned generally at a top of the carrier housing 30 when a vehicle that is equipped with the axle assembly 10 (FIG. 1) is operatively positioned on level ground. The air balance orifice 730 can be in fluid communication with the clutch cavity 70 and the differential cavity 72 to permit air to flow therebetween to maintain an equal pressure within the clutch cavity 70 and the differential cavity 72. Thus, pressure differentials between the clutch cavity 70 and the differential cavity 72, which could affect the level of the oil in the sump 28, the clutch cavity 70, or the differential cavity 72, can be prevented. In the example provided, the air balance orifice 730 is open to the clutch cavity 70 and to the oil transfer passage 1014 to permit air flow therebetween.

Figure 11:
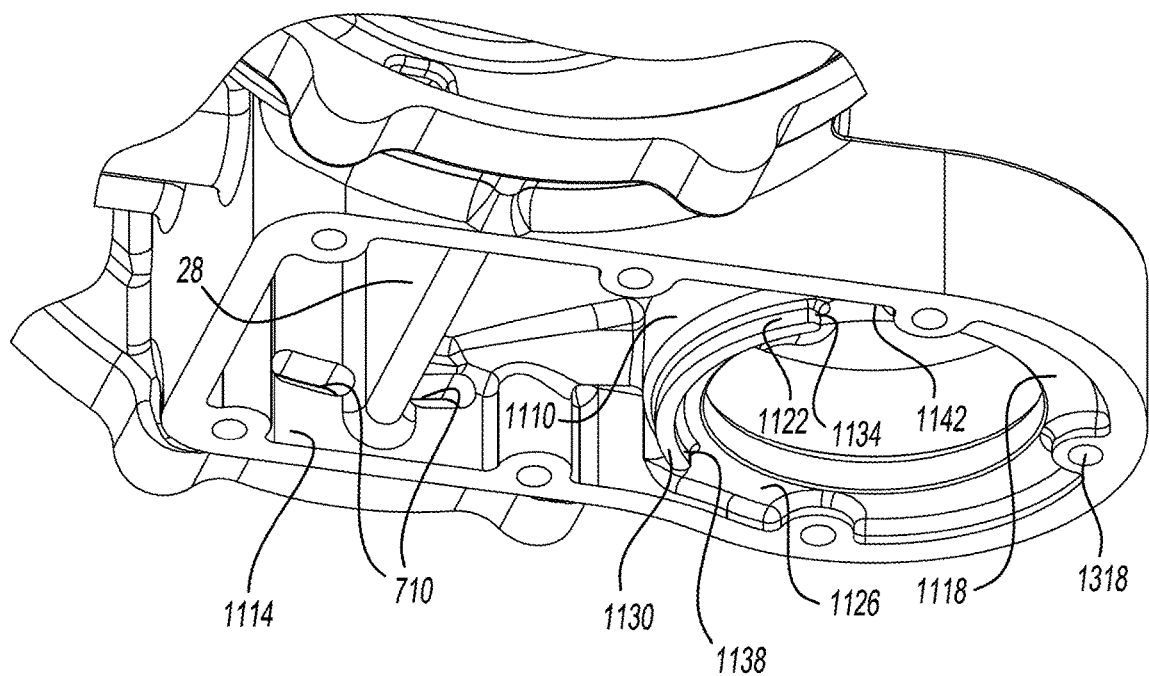
FIG. 11 is a bottom perspective view of the carrier housing of FIG. 6.
Figure 12:
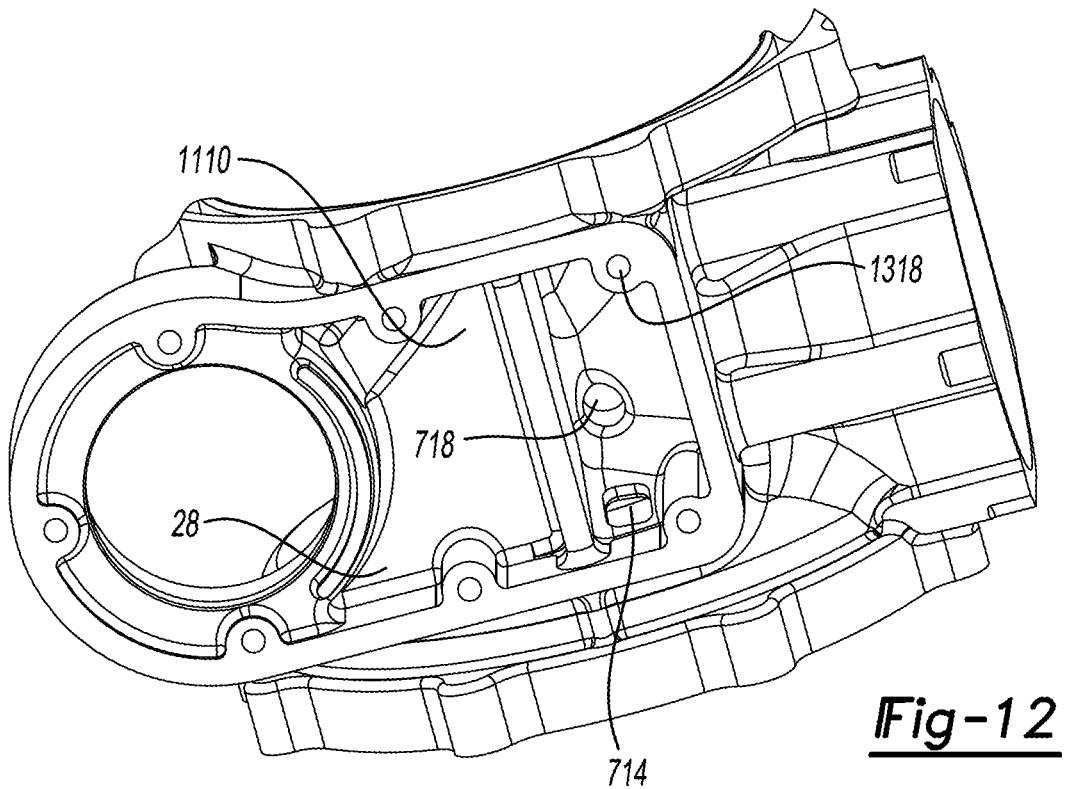
FIG. 12 is a different bottom perspective view of the carrier housing of FIG. 6.

With reference to FIGS. 11 and 12, the carrier housing 30 can define an upper sump cavity 1110 open to the bottom side 918 of the carrier housing 30. The upper sump cavity 1110 can include a upper receiving area 1114 and a upper pump drawing area 1118. The clutch return passage 710, the differential return passage 714, and the central return passage 718 can be open to the upper receiving area 1114. The pump bore 910 can be open to the upper pump drawing area 1118 of the upper sump cavity 1110.

The carrier housing 30 can include an upper baffle 1122 that can extend from an inner face 1126 of the upper sump cavity 1110 toward the bottom side 918. The upper baffle 1122 can generally separate the upper receiving area 1114 from the upper pump drawing area 1118. The upper baffle 1122 can be an arcuate shape disposed partially about the pump bore 910. In the example provided, opposite longitudinal ends 1130, 1134 of the upper baffle 1122 are spaced apart from opposite lateral sides 1138, 1142 of the upper sump cavity 1110 such that oil can flow from the upper receiving area 1114 to the upper pump drawing area 1118 between the longitudinal ends 1130, 1134 of the upper baffle 1122 and the corresponding lateral side 1138, 1142 of the upper sump cavity 1110.

Figure 13:
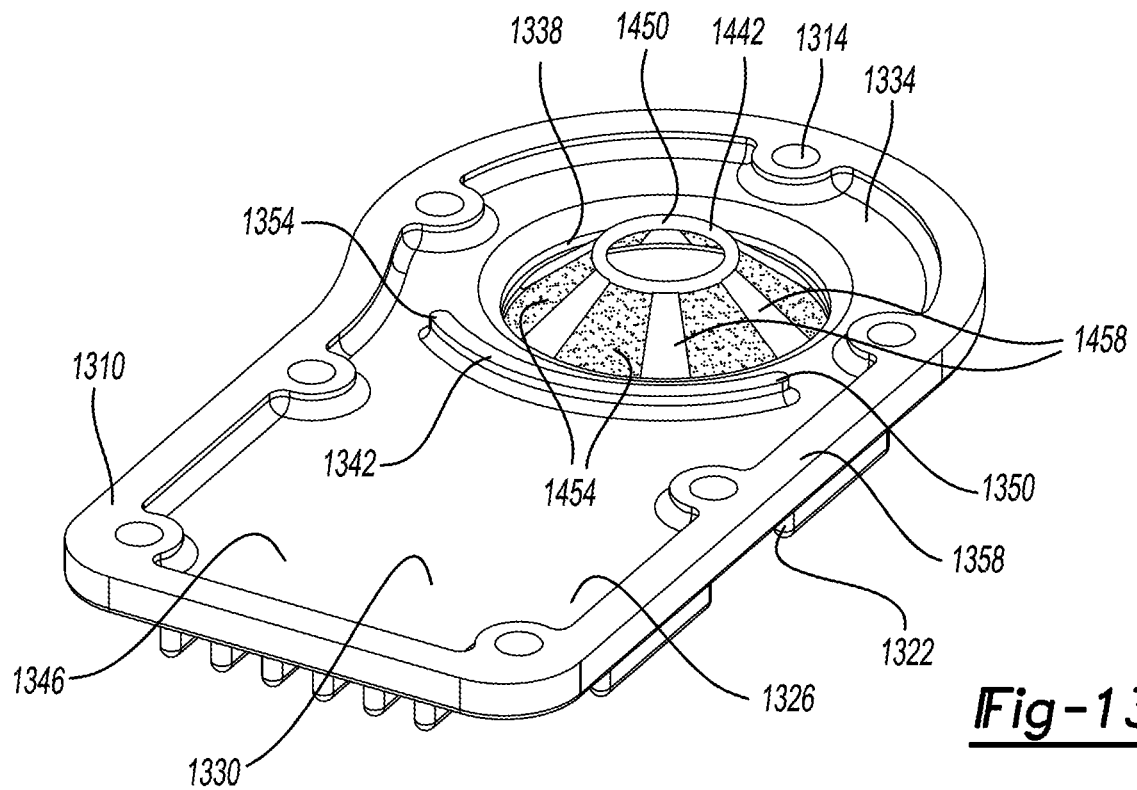
FIG. 13 is a perspective view of an oil pan of the axle assembly of FIG. 1.

With additional reference to FIG. 13, the oil pan 26 can be mounted to the carrier housing 30 such that an upper side 1310 of the oil pan 26 can sealingly abut the bottom side 918 of the carrier housing 30. In the example provided the oil pan 26 includes a plurality of mounting holes 1314 and the carrier housing includes corresponding threaded bores 1318 (shown on FIGS. 11 and 12) such that the oil pan 26 can be coupled to the bottom side 918 with threaded fasteners (e.g., bolts). A gasket can be disposed between the oil pan 26 and the bottom side 918 to form a seal therebetween. The oil pan 26 can also include a plurality of fins 1322 on a bottom side of the oil pan 26 which can act to dissipate heat from the oil pan 26 as air flows under the vehicle and across the fins 1322.

The oil pan 26 can define a lower sump cavity 1326 open toward the upper sump cavity 1110 such that the upper sump cavity 1110 and the lower sump cavity 1326 cooperate to define the sump 28. The lower sump cavity 1326 can include a lower receiving area 1330 and a lower pump drawing area 1334 which can align with the upper receiving area 1114 and the upper pump drawing area 1118 of the upper sump cavity 1110. The oil pan 26 can include a filter recess or well 1338 located in the lower pump drawing area 1334. The filter well 1338 can be cylindrical in shape, extending away from the upper side 1310 of the oil pan 26, though other configurations can be used, such as a flat panel filter (not specifically shown). In the example provided, the filter well 1338 can be coaxial with the pump bore 910.

The oil pan 26 can include a lower baffle 1342 that can extend from an inner face 1346 of the lower sump cavity 1326 toward the upper side 1310 of the oil pan 26. The lower baffle 1342 can generally separate the lower receiving area 1330 from the lower pump drawing area 1334. In the example provided, the lower baffle 1342 can be an arcuate shape disposed partially about the filter well 1338 and can be complementary to the upper baffle 1122. In the example provided, opposite longitudinal ends 1350, 1354 of the lower baffle 1342 are spaced apart from opposite lateral sides 1358, 1362 of the lower sump cavity 1326 such that oil can flow from the lower receiving area 1330 to the lower pump drawing area 1334 as described in greater detail below. A bottom face of the upper baffle 1122 can contact an upper face of the lower baffle 1342 such that the upper baffle 1122 and lower baffle 1342 can generally block oil from flowing from the receiving areas 1114, 1330 to the pump drawing areas 1118, 1334, while permitting oil to flow around upper baffle 1122 and lower baffle 1342 between their respective longitudinal ends 1130, 1134, 1350, 1354 and the corresponding lateral sides 1138, 1142, 1358, 1362. Thus, the upper baffle 1122 and lower baffle 1342 can inhibit sloshing of the oil in the sump 28 and inhibit starving of the pump 238.

Figure 14:
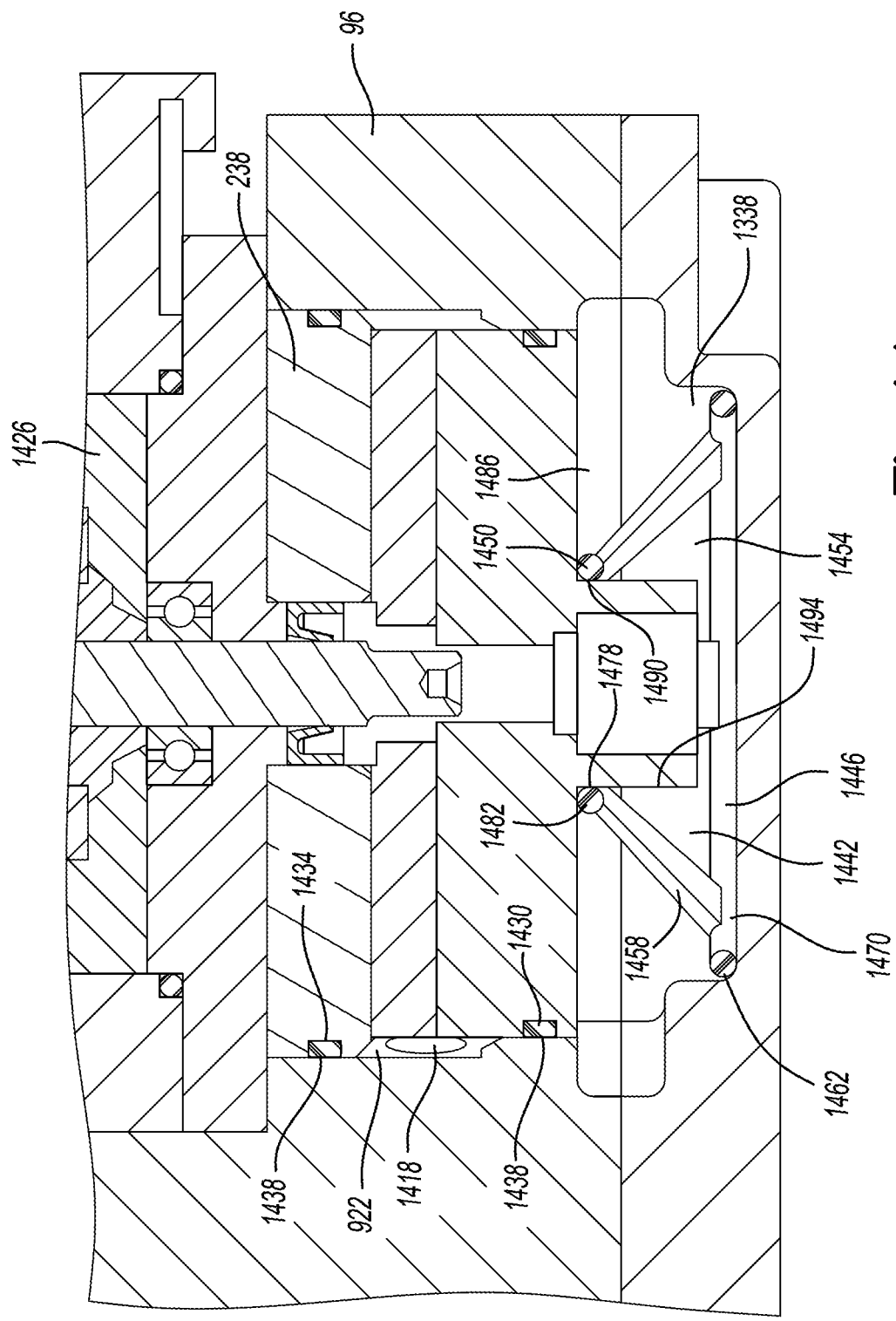
FIG. 14 is a sectional view of a portion of the axle assembly of FIG. 1, taken along a rotational axis of a pump of the axle assembly.

With additional reference to FIG. 14, the pump 238 includes a pump housing 1410 that has an inlet 1414, an outlet 1418, and a plurality of mounting bores such that the mounting bolts 926 can be received therethrough to mount the pump 238 to the carrier housing 30. The pump 238 is driven by an electric motor 1426 to rotate the rotational element of the pump 238 to pump oil from the inlet 1414 to the outlet 1418. The inlet 1414 is located proximate to the bottom side 918 of the carrier housing 30 and can extend into the sump 28. The outlet 1418 is located proximate to the oil supply passage 922 such that the pump 238 can pump oil into the oil supply passage 922. In the example provided, the pump housing 1410 also includes a first O-ring groove 1430 and a second O-ring groove 1434 located about an outer cylindrical surface 1436 of the pump housing 1410 and configured to receive O-rings 1438 therein to form a seal between the pump housing 1410 and the pump bore 910. The first O-ring groove 1430 and corresponding O-ring 1438 can be located axially between the bottom side 918 of the pump mount 96 and the oil supply passage 922. The second O-ring ring groove 1434 and corresponding O-ring 1438 can be located axially between the oil supply passage 922 and the upper side 914 of the pump mount 96.

With reference to FIGS. 13 and 14, a filter can generally be provided in the sump 28 to filter the oil as it is drawn from the sump 28 to enter inlet 1414 of the pump 238. In the example provided, a filter 1442 can be received in the filter well 1338 and configured to filter the oil as it is drawn from the sump 28 to enter inlet 1414 of the pump 238. The filter 1442 can have a generally frusto-conical shape including a base end 1446, a frustum end 1450, and a filter element 1454 that can be conical in shape and extend between the base end 1446 and the frustum end 1450. The filter 1442 can also include a plurality of circumferentially spaced apart support members 1458 that extend between the base end 1446 and the frustum end 1450 to support the frustum end 1450 relative to the base end 1446. The support members 1458 can also support the filter element 1454. The filter element 1454 can be configured to permit oil to flow through the filter element 1454 while preventing particulates from flowing through. In the example provided, the filter element 1454 is a fine wire mesh, though other configurations can be used.

The base end 1446 can be received in the filter well 1338 and can sealingly engage the filter well 1338. In the example provided, the base end 1446 has a press-fit with the filter well 1338 such that an outer circumferential surface 1462 of the base end 1446 seals with an inner circumferential surface of the filter well 1338. Alternatively or additionally, a bottom axial surface 1470 of the base end 1446 can seal with a bottom surface of the filter well 1338. The frustum end 1450 can define a filter aperture 1478. The filter aperture 1478 can be coaxial with the filter well 1338 and the pump bore 910. The filter aperture 1478 can receive the inlet 1414 of the pump 238. The frustum end 1450 can sealingly engage with the pump 238 such that the pump 238 draws oil through the filter element 1454 and into the inlet port 1414. In the example provided a top surface 1482 of the frustum end 1450 forms a seal with a bottom surface 1486 of the pump 238. Alternatively or additionally, an inner circumferential surface 1490 of the filter aperture 1478 can form a seal with an outer circumferential surface 1494 of the inlet port 1414.

In operation, the pump 238 can draw oil from the sump 28, through the filter 1442, and pump the oil through the oil supply passage 922, to the cylinder 260. The bleed port 1010 can be configured to restrict flow from the cylinder 260 to a flowrate that is less than the flowrate of the pump 238. In this way, the pump 238 can supply pressurized oil to the cylinder 260 of the actuator 156 to move the piston 262 to compress the clutch pack 154 of the clutch 20.

The oil exiting the cylinder 260 through the bleed port 1010 can travel through the oil transfer passage 1014 to the differential cavity 72. Since the oil transfer passage 1014 is located generally toward the top of the differential cavity 72, the oil can flow down, over the differential assembly 18 to lubricate the differential assembly 18. The internal gear 110 and other rotating components of the differential assembly 18 can also rotate through oil that gathers at the bottom of the differential cavity 72, to lubricate the differential assembly 18 and the input pinion 14. Oil can flow from the differential cavity 72 back to the sump 28 through the differential return passage 714.

Figure 15:
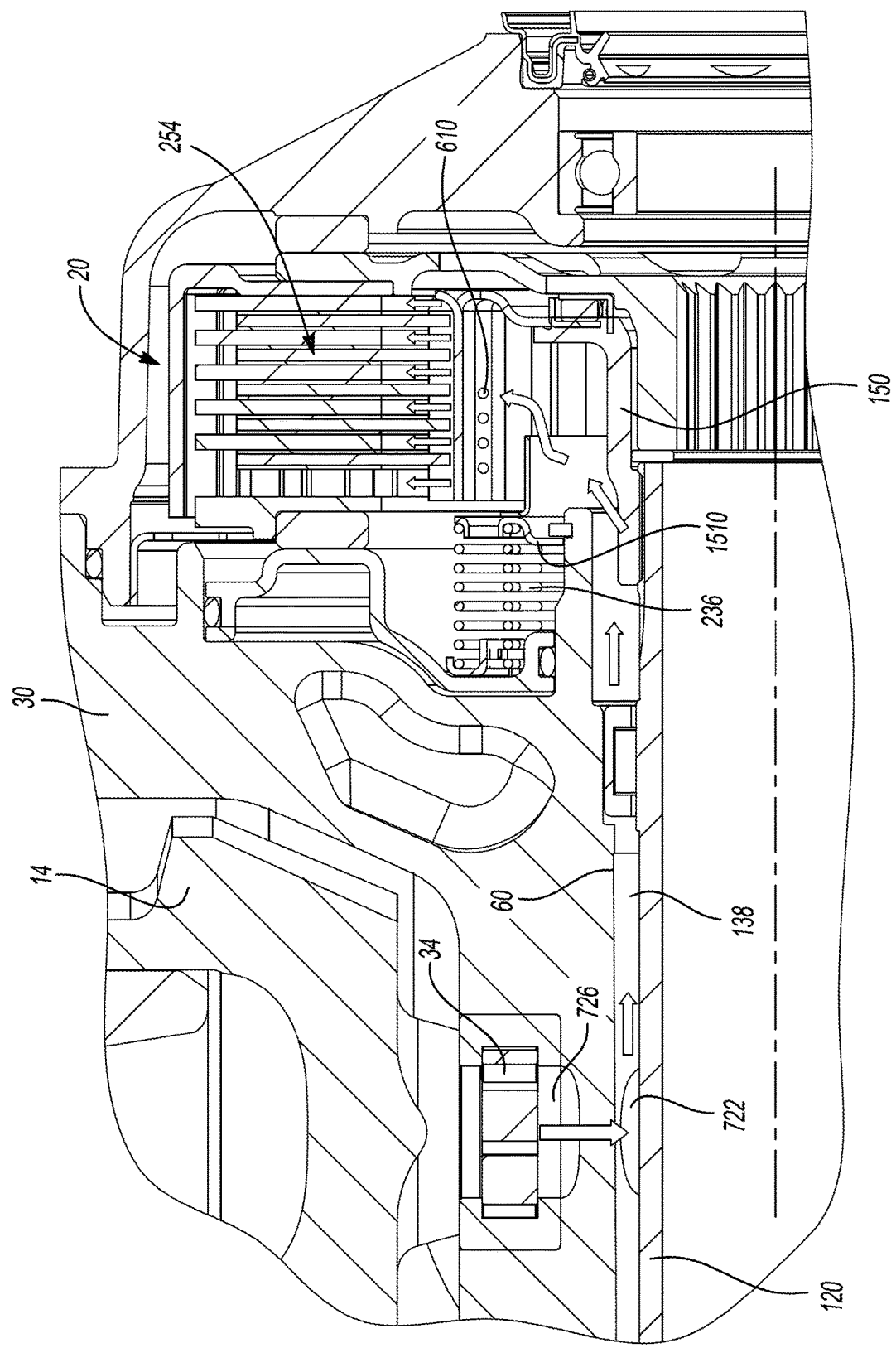
FIG. 15 is a sectional view of a portion of the axle assembly of FIG. 1, schematically illustrating one oil flow path.

Oil can also be transferred from the differential cavity 72, via the internal gear 110, to the input pinion 14 and flow from the input pinion 14 though the head bearing 34. As best shown in FIG. 15, oil can flow through the head bearing 34, through the pinion return passage 722, to the central bore 138 between the spindle 136 and the tubular portion 60 of the carrier housing 30. From the central bore 138, some oil can return to the sump 28 through the central return passage 718, while some oil can also flow from the central bore 138 through the bearing 140, and to the clutch cavity 70. The size of the central return passage 718 can be tailored to control the amount of oil flowing from the central bore 138 to the sump 28 relative to the amount of oil flowing to the clutch cavity 70.

Oil flowing from the central bore 138 to the clutch cavity 70 can travel via the centrifugal force of the spinning inner clutch basket (e.g., the first clutch portion 150) radially outward through lubricating bores 610 (shown in FIG. 6) in the first clutch portion 150 to lubricate the clutch pack 154. While FIG. 6 shows 3 lubricating bores 610 on one of the splines, other numbers of lubricating bores 610 can be included and the lubricating bores 610 can be formed on more than one of the splines, and/or can be formed in the valleys between the splines. The spring plate 1510 can be disposed between the springs 236 and the first clutch portion 150 to act as an oil deflector and direct the oil toward the lubrication bores 610 to prevent the oil from exiting axially from the first clutch portion 150. The rotating outer clutch basket (e.g., the second clutch portion 152) can also churn through oil located in the bottom of the clutch cavity 70 to lubricate the clutch pack 154. Oil can then return to the sump 28 from the clutch cavity 70 through the clutch return passage 710.

Figure 16:
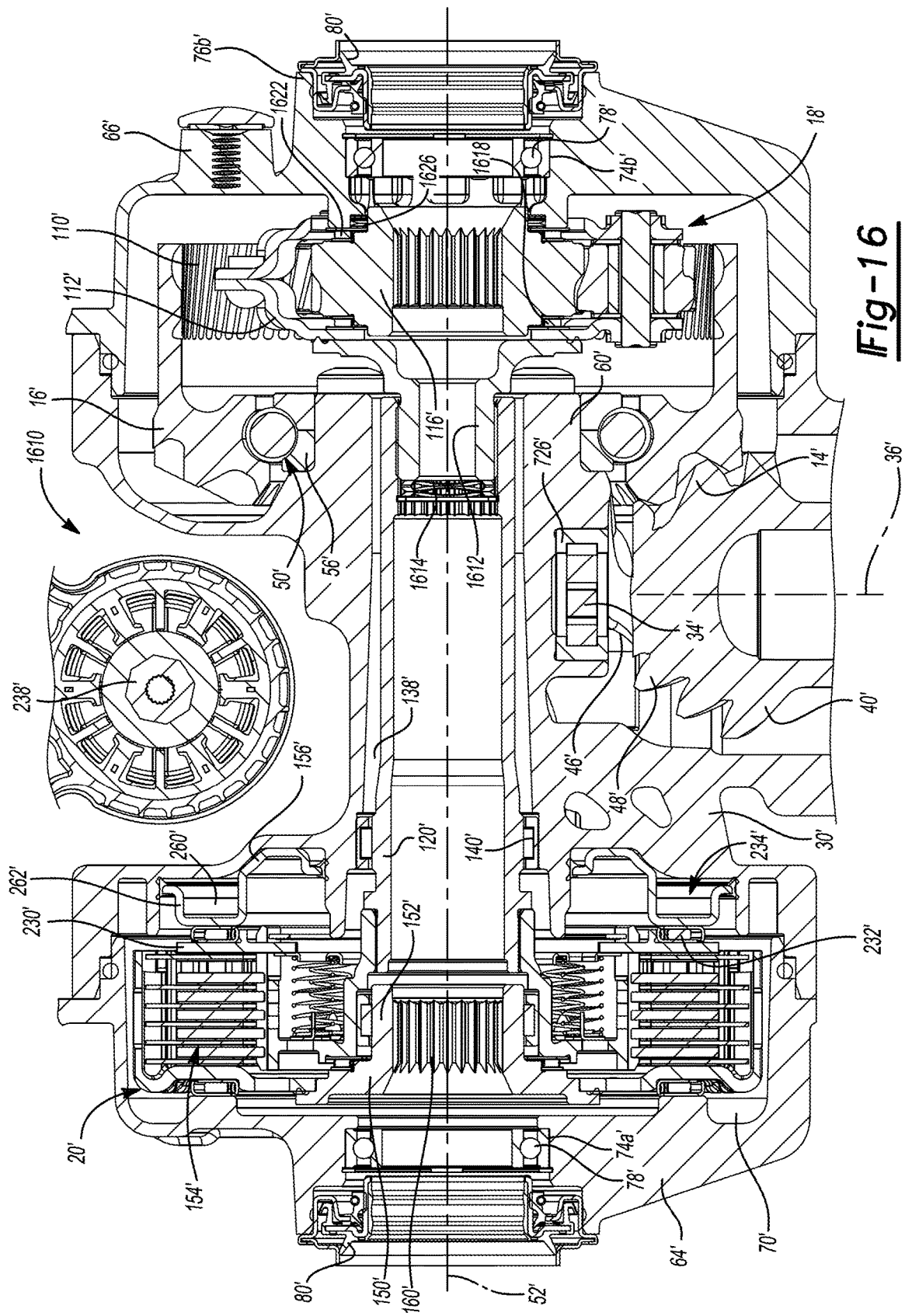
FIG. 16 is a sectional view similar to FIG. 4, illustrating an axle assembly of a second construction in accordance with the teachings of the present disclosure.
Figure 19:
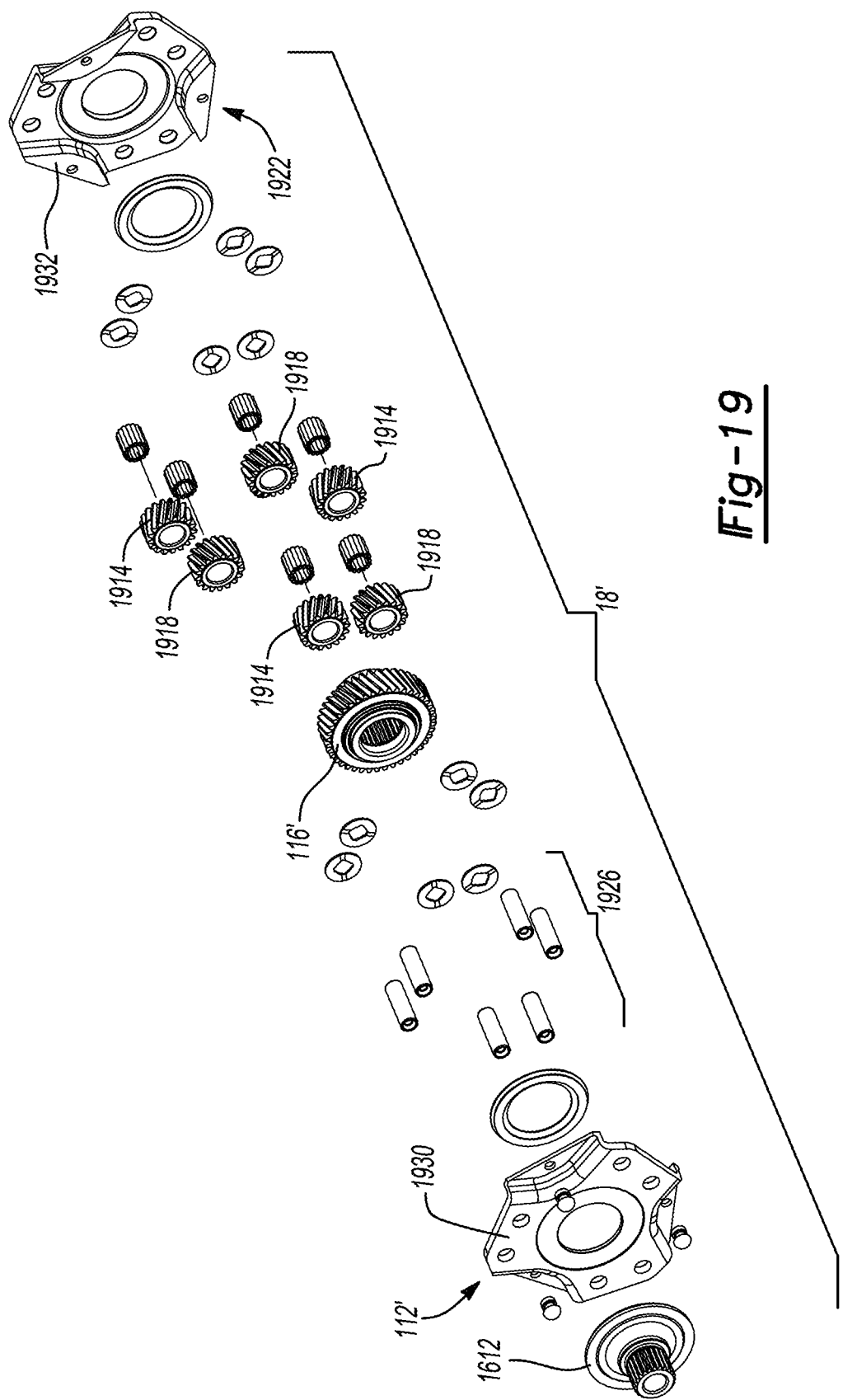
FIG. 19 is an exploded perspective view of a portion of a differential of the axle assembly of FIG. 16.

With additional reference to FIGS. 16 and 19, an axle assembly 1610 of a second construction is illustrated. The axle assembly 1610 can be similar to the axle assembly 10, except as otherwise shown or described herein. Primed reference numerals indicate elements that are similar to elements described above with reference to similar, non-primed, lesser-primed, or greater-primed reference numerals. For example, the springs 236' and spring plate 1510' can be similar to the springs 236 and spring plate 1510 except that the springs 236' and spring plate 1510' can be disposed axially between the first clutch portion 150 and the apply plate 230. In the example provided, one end of the springs 236' can abut the first clutch portion 150 radially inward of the clutch pack 254, while the other end of the springs 236' can abut the spring plate 1510', which can abut the apply plate 230. In this way, the springs 236' can bias the piston 262 toward the retracted position via the apply plate 230 and the thrust bearing 232, while maintaining load on the thrust bearing 232. In the example provided, a gap can be defined between the spring plate 1510' and the first clutch portion 150, and/or apertures can be formed in the spring plate 1510', such that the oil can be permitted to flow from the central bore 138 through the lubricating bores 610 to lubricate the clutch pack 254, as otherwise discussed above.

In the example provided in FIGS. 16 and 19, the tubular shaft 120' and differential assembly 18' can be similar to the tubular shaft 120 and differential assembly 18 described above, except as otherwise shown or described herein. Similar to the differential assembly 18, the differential assembly 18' can be a planetary-type differential having an internal gear 110', a planet carrier 112', a sun gear 116', and a plurality of planet gear pairs that each include a first planet gear 1914 and a second planet gear 1918. The planet carrier 112' can include a carrier body 1922 and a plurality of pins 1926. The carrier body can include a pair of carrier plates 1930 and 1932 that can be similar to the carrier plates described above with reference to the planet carrier 112. In the example provided, the tubular shaft 120' can define a plurality of internal splines that can mate with external splines formed on a flange 1612. The flange 1612 can extend radially outward of the tubular shaft 120' and can be fixedly coupled to one of the carrier plates 1930, such as by welding for example. The first planet gears 1914 can be meshingly engaged with the internal gear 110' and a corresponding one of the second planet gears 1918. The second planet gears 1918 can be meshingly engaged with the sun gear 116'.

In the example provided, a spring 1614 can be included to bias the tubular shaft 120' axially in a direction away from the planet carrier 112' to ensure loading of various thrust bearings within the axle assembly 10'. In the example provided, a needle roller thrust bearing 1618 can be disposed between the sun gear 116 and one of the carrier plates, while another needle roller thrust bearing 1622 can be disposed between the opposite side of the sun gear 116 and the second end cap 66. In the example provided, another spring 1626 can be disposed between the second end cap 66 and the sun gear 116 to bias the sun gear axially in a direction away from the second end cap 66.

Figure 17:
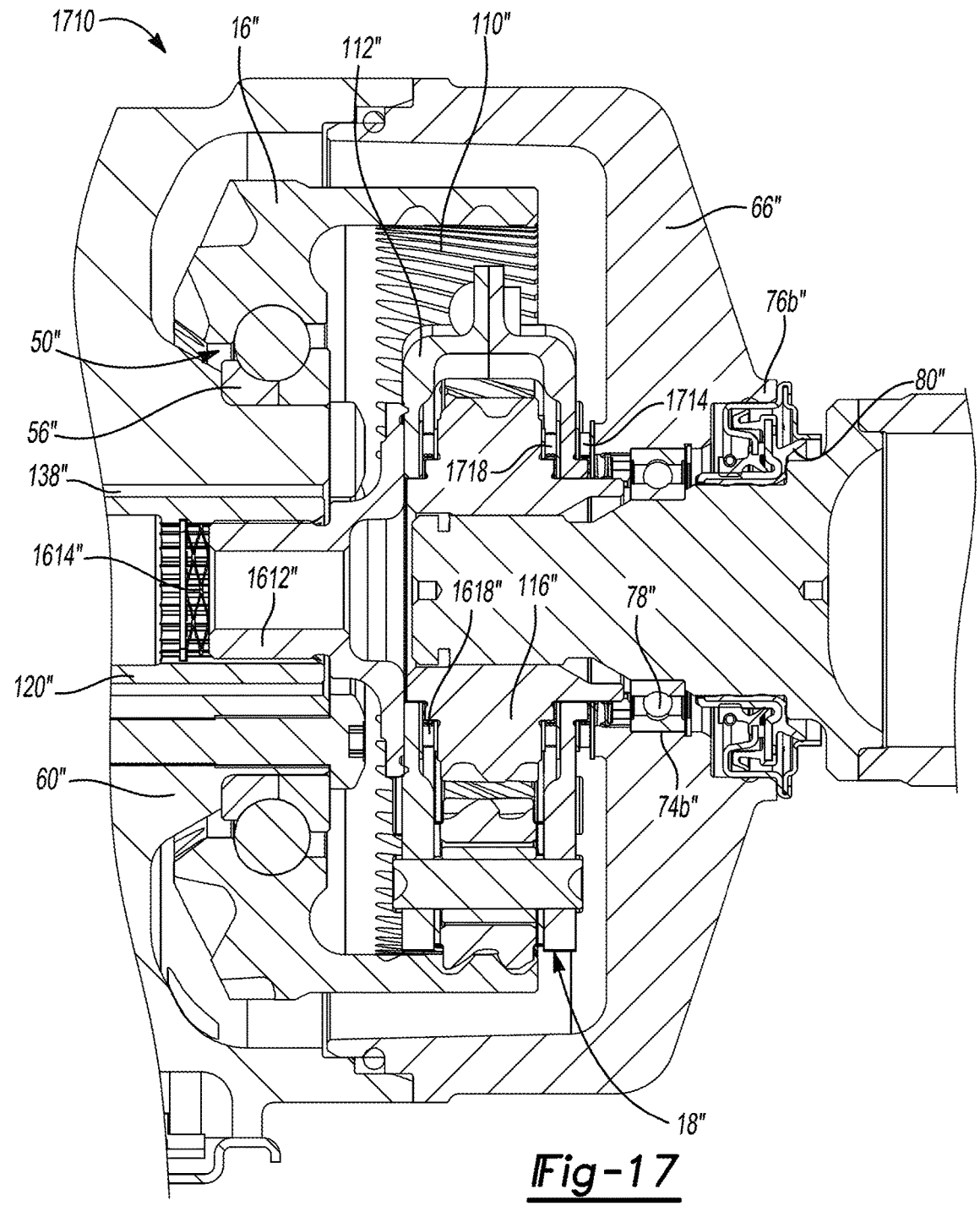
FIG. 17 is a sectional view of a portion of an axle assembly of a third construction in accordance with the teachings of the present disclosure.

With additional reference to FIG. 17, an axle assembly 1710 of a third construction is illustrated. The axle assembly 1710 can be similar to the axle assemblies 10 and 1610, except as otherwise shown or described herein. Primed reference numerals indicate elements that are similar to elements described above with reference to similar, non-primed, lesser-primed, or greater-primed reference numerals. In the example provided, the carrier plate opposite the flange 1612 can extend axially between a portion of the sun gear 116" and a portion of the second end cap 60". In the example provided, a needle roller thrust bearing 1714 can be disposed between that carrier plate and the portion of the second end cap 60" and another needle roller thrust bearing 1718 can be between the sun gear 116" and that carrier plate.

Figure 18:
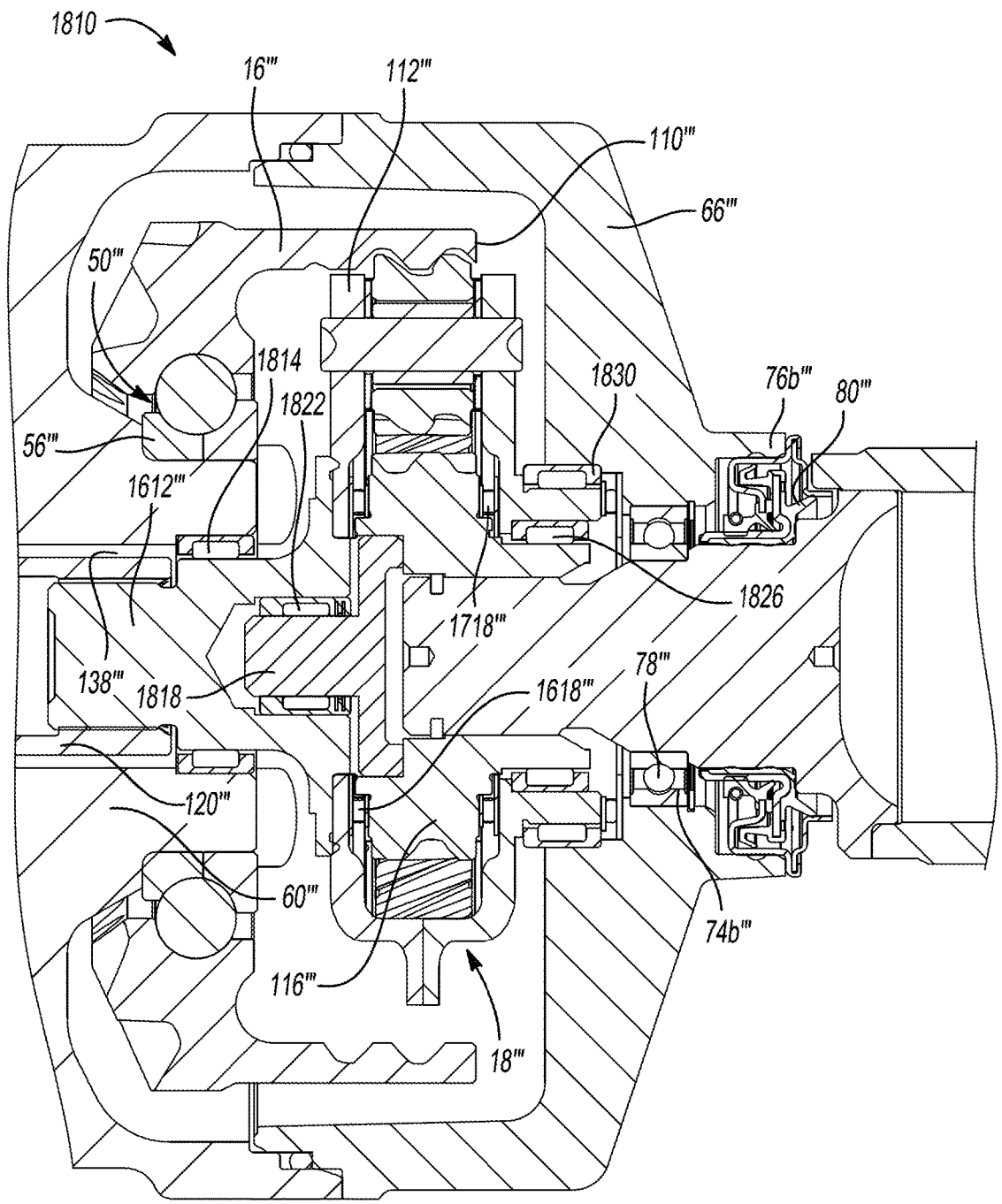
FIG. 18 is a sectional view similar to FIG. 17, illustrating a portion of an axle assembly of a fourth construction in accordance with the teachings of the present disclosure.

With additional reference to FIG. 18, an axle assembly 1810 of a fourth construction is illustrated. The axle assembly 1810 can be similar to the axle assemblies 10, 1610, and 1710 except as otherwise shown or described herein. Primed reference numerals indicate elements that are similar to elements described above with reference to similar, non-primed, lesser-primed, or greater-primed reference numerals. In the example provided, the tubular shaft 120''' terminates axially within the tubular portion 60 of the carrier housing 30 and a bearing 1814 can be disposed radially between a flange 1612''', which can be similar to the flange 1612 except as otherwise described herein. In the example provided, a hub 1818 can be supported concentrically within the flange 1612''' by a bearing 1822 that is radially between the hub 1818 and the flange 1612'''. The hub 1818 can extend axially from an end of the flange 1612''' that is opposite the tubular shaft 120''' and can be coupled to the sun gear 116'''. The hub 1818 can be concentric with the sun gear 116''' and, in the example provided, the hub 1818 can be press fit into a bore formed in one end of the sun gear 116''', though other configurations can be used. In the example provided, a bearing 1826 can be disposed radially between a portion of the sun gear 116''' and a portion of the carrier plate that is opposite the flange 1612''', and another bearing 1830 can be disposed radially between that portion of the carrier plate and the second end cap 60'''.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A disconnecting axle assembly comprising:
a housing assembly including a first end cap, a second end cap, a sump cover, and a housing member, the housing member defining a central bore, a clutch return passage, and a differential return passage, the first end cap being fixedly coupled to a first side of the housing member such that the first end cap and the housing member define a clutch cavity, the second end cap being fixedly coupled to a second side of the housing member such that the second end cap and the housing member define a differential cavity spaced apart from the clutch cavity, the central bore being disposed about an output axis and extending axially between the clutch cavity and the differential cavity, the sump cover being fixedly coupled to a third side of the housing member such that the sump cover and the housing member define a sump that is spaced apart from the clutch cavity, the differential cavity, and the central bore, the clutch return passage coupling the clutch cavity to the sump in fluid communication, and the differential return passage coupling the differential cavity to the sump in fluid communication;
a differential disposed within the differential cavity, the differential including an input member, a first output member, and a second output member, the first output member being supported within the housing assembly for rotation about the output axis and extending axially within the central bore; and
a clutch including a plurality of friction plates disposed within the clutch cavity and an actuator, a first set of the friction plates being coupled to the first output member for common rotation about the output axis, a second set of the friction plates being interleaved with the first set and coupled to a third output member for common rotation about the output axis, the actuator including a pump and a piston slidably disposed in a cylinder, the piston being configured to axially compress the friction plates to selectively transmit torque between the first and third output members, the pump being coupled to the housing assembly and configured to pump fluid from the sump to the cylinder.

2. The disconnecting axle assembly of claim 1, wherein the clutch return passage has a first aperture open to the clutch cavity proximate to a bottom of the clutch cavity and the clutch return passage is open to the sump at a location below the first aperture, and wherein the differential return passage has a second aperture open to the differential cavity proximate to a bottom of the differential cavity and the differential return passage is open to the sump at a location that is below the second aperture.

3. The disconnecting axle assembly of claim 1, wherein the housing member further defines a bore return passage having an inlet open to the central bore and an outlet open to the sump, the inlet of the bore return passage being above the outlet of the bore return passage.

4. The disconnecting axle assembly of claim 1, wherein the clutch includes a first clutch portion and a second clutch portion, the first friction plates being axially slidable relative to the first clutch portion and coupled for common rotation about the output axis with the first clutch portion, the second friction plates being axially slidable relative to the second clutch portion and coupled for common rotation about the output axis with the second clutch portion, the first clutch portion being fixedly coupled to the first output member and including a projection that extends radially outward to inhibit movement of the first and second clutch plates in a first axial direction to retain the first and second clutch plates between the first and second clutch portions.

5. The disconnecting axle assembly of claim 1, wherein the housing member further defines an air balance passage, the air balance passage extending axially between the clutch cavity and the differential cavity and being spaced apart from the central bore and open to the clutch cavity and the differential cavity above the output axis.

6. The disconnecting axle assembly of claim 5, wherein the housing member defines a bleed port open to the cylinder and the air balance passage and configured to restrict flow of fluid from the cylinder to a flowrate that is less than a flowrate of fluid pumped from the sump to the cylinder.

7. The disconnecting axle assembly of claim 1, wherein the differential includes a differential gearset configured to receive input torque from the input member and output differential torque to the first and second output members.

8. The disconnecting axle assembly of claim 7, wherein the differential gearset is a planetary gearset including an internal gear, a planet carrier, a plurality of planet gears, and a sun gear, wherein the input member of the differential is fixedly coupled to the internal gear, the first output is fixedly coupled to the planet carrier, and the second output is fixedly coupled to the sun gear.

9. The disconnecting axle assembly of claim 8, wherein the first output member includes a tubular shaft and a flange member, wherein a first end of the flange member includes a plurality of splines that meshingly engage a plurality of mating splines on the tubular shaft within the central bore, and a second end of the flange member is disposed within the differential cavity and extends radially outward of the first end of the flange member and is fixedly coupled to the planet carrier.

10. The disconnecting axle assembly of claim 9, wherein the sun gear includes a hub member that is supported by the first output member by a bearing disposed radially between the first output member and the hub member.

11. The disconnecting axle assembly of claim 1, further comprising a hypoid gear and an input pinion, the input member of the differential being fixedly coupled to the hypoid gear, the input pinion being meshingly engaged with the hypoid gear and being rotatably supported by the housing member for rotation about a second axis that is transverse to the output axis.

12. The disconnecting axle assembly of claim 11, further comprising a head bearing disposed within a bearing recess defined by the housing member, the head bearing supporting the input pinion for rotation relative to the housing member, wherein the housing member further defines a pinion return passage that couples the bearing recess and the central bore in fluid communication.

13. A disconnecting axle assembly comprising:
a housing assembly including a first end cap, a second end cap, a sump cover, and a housing member, the housing member defining a central bore, a clutch supply passage, and a clutch return passage, the first end cap being fixedly coupled to a first side of the housing member such that the first end cap and a first annular wall of the housing member define a clutch cavity, the second end cap being fixedly coupled to a second side of the housing member such that the second end cap and a second annular wall of the housing member define a differential cavity spaced apart from the clutch cavity, the central bore being disposed about an output axis and extending axially between the first and second annular walls to couple the clutch cavity and the differential cavity for fluid communication, the sump cover being fixedly coupled to a third side of the housing member such that the sump cover and the housing member define a sump that is spaced apart from the clutch cavity, the differential cavity, and the central bore, the housing member including a third annular wall and a fourth annular wall that extend axially from the first annular wall to define an annular cylinder, the clutch supply passage being open through the first annular wall radially between the third and fourth annular walls to be in fluid communication with the annular cylinder, the clutch return passage being open through the first annular wall radially outward of the annular cylinder and coupling the clutch cavity to the sump for fluid communication;

a differential disposed within the differential cavity, the differential including an input member, a first output member, and a second output member, the first output member being supported within the housing assembly for rotation about the output axis and extending axially within the central bore; and a clutch including a plurality of friction plates disposed within the clutch cavity and an actuator, a first set of the friction plates being coupled to the first output member for common rotation about the output axis, a second set of the friction plates being interleaved with the first set and coupled to a third output member for common rotation about the output axis, the actuator including a piston and a pump, the piston being slidably disposed in the annular cylinder, the piston being configured to axially compress the friction plates to selectively transmit torque between the first and third output members, the pump having an inlet in fluid communication with the sump and an outlet in fluid communication with the clutch supply passage.

14. The disconnecting axle assembly of claim 13, wherein the clutch return passage has a first aperture open to the clutch cavity proximate to a bottom of the clutch cavity and the clutch return passage is open to the sump at a location below the first aperture.

15. The disconnecting axle assembly of claim 13, wherein the housing member defines a differential return passage that has a first aperture open to the differential cavity proximate to a bottom of the differential cavity and the differential return passage is open to the sump at a location that is below the first aperture.

16. The disconnecting axle assembly of claim 13, wherein the housing member further defines a bore return passage having an inlet open to the central bore and an outlet open to the sump, the inlet of the bore return passage being above the outlet of the bore return passage.

17. The disconnecting axle assembly of claim 13, wherein the clutch includes a first clutch portion and a second clutch portion, the first friction plates being axially slidable relative to the first clutch portion and coupled for common rotation about the output axis with the first clutch portion, the second friction plates being axially slidable relative to the second clutch portion and coupled for common rotation about the output axis with the second clutch portion, the first clutch portion being fixedly coupled to the first output member and including a projection that extends radially outward to inhibit movement of the first and second clutch plates in a first axial direction to retain the first and second clutch plates between the first and second clutch portions.

18. The disconnecting axle assembly of claim 13, wherein the housing member further defines an air balance passage and a bleed port, the air balance passage being spaced apart from the central bore and open through the first and second annular walls to couple the clutch cavity and the differential cavity for fluid communication above the output axis, the bleed port being open through the first annular wall radially between the third and fourth annular walls to be open to the annular cylinder, the bleed port further being open to the air balance passage and configured to restrict flow of fluid from the cylinder to a flowrate that is less than a flowrate of fluid pumped from the sump to the cylinder.

19. The disconnecting axle assembly of claim 13, wherein the differential includes a planetary gearset including an internal gear, a planet carrier, a plurality of planet gears, and a sun gear, wherein the input member of the differential is fixedly coupled to the internal gear, the first output is fixedly coupled to the planet carrier, and the second output is fixedly coupled to the sun gear.

20. The disconnecting axle assembly of claim 19, wherein the first output member includes a tubular shaft and a flange member, wherein a first end of the flange member includes a plurality of splines that meshingly engage a plurality of mating splines on the tubular shaft within the central bore, and a second end of the flange member is disposed within the differential cavity and extends radially outward of the first end of the flange member and is fixedly coupled to the planet carrier.

* * * * *